US012386924B1

(12) United States Patent
Parwani et al.

(10) Patent No.: US 12,386,924 B1
(45) Date of Patent: Aug. 12, 2025

(54) DERIVING INPUT RESTRICTIONS FOR ARTIFICIAL INTELLIGENCE AGENTS

(71) Applicant: Airia LLC, Alpharetta, GA (US)

(72) Inventors: Rahul Parwani, Atlanta, GA (US); Rohit Pradeep Shetty, Bangalore (IN)

(73) Assignee: Airia LLC, Alpharetta, GA (US)

( * ) Notice: Subject to any disclaimer, the term of this patent is extended or adjusted under 35 U.S.C. 154(b) by 0 days.

(21) Appl. No.: 18/946,880

(22) Filed: Nov. 13, 2024

Related U.S. Application Data

(63) Continuation-in-part of application No. 18/885,556, filed on Sep. 13, 2024.

(60) Provisional application No. 63/658,434, filed on Jun. 10, 2024.

(51) Int. Cl.
    *G06F 21/12* (2013.01)
    *G06F 16/3332* (2025.01)
    *G06F 21/62* (2013.01)

(52) U.S. Cl.
    CPC ........ *G06F 21/121* (2013.01); *G06F 16/3332* (2019.01); *G06F 21/6245* (2013.01)

(58) Field of Classification Search
    CPC .............. G06F 21/121; G06F 16/3332; G06F 21/6245; G06F 21/12; G06F 21/62
    See application file for complete search history.

(56) References Cited

U.S. PATENT DOCUMENTS

| | | | |
|---|---|---|---|
| 2021/0248268 A1* | 8/2021 | Ardhanari | G06F 21/53 |
| 2024/0419837 A1* | 12/2024 | Sankaranarayanan | G06F 21/604 |
| 2025/0045451 A1* | 2/2025 | Ramakrishnan | G06N 20/10 |

FOREIGN PATENT DOCUMENTS

CA    3022864 A1 *  1/2017  ........... G01C 21/387

* cited by examiner

*Primary Examiner* — Jayesh M Jhaveri
(74) *Attorney, Agent, or Firm* — Clayton, McKay & Bailey, PC

(57) ABSTRACT

The invention provides a rules engine that manages user requests within an interface integrating multiple AI platforms and AI Models. Upon receiving a query, the engine assigns scores based on factors like management rules, user preferences, and contextual information. Determinative scores, such as those enforcing strict enterprise policies, can override others, leading the engine to block or reroute the query. If no score is determinative, the engine forwards the query and associated prompts to a specialized routing AI Model for contextual analysis. Based on this analysis, the rules engine directs the query to the most appropriate AI Model or defaults to the user-designated AI Model. This system balances user intent with rule enforcement, optimizing query processing across various AI platforms while ensuring compliance with enterprise guidelines.

20 Claims, 10 Drawing Sheets

DERIVING INPUT RESTRICTIONS FOR ARTIFICIAL INTELLIGENCE AGENTS

CROSS-REFERENCES TO RELATED APPLICATIONS

This application claims priority as a continuation-in-part application to U.S. application Ser. No. 18/885,556, filed Sep. 13, 2024, titled "Dynamic Enforcement of Management Rules Associated with Artificial Intelligence Modeling," which claims priority to U.S. provisional application No. 63/658,434, titled "Artificial Intelligence Pipeline Platform," filed on Jun. 10, 2024, the contents of which are incorporated herein in their entirety.

BACKGROUND

The present invention relates to artificial intelligence ("AI") systems and, more specifically, to monitoring and maintaining the consistency of results generated by AI pipelines.

AI pipelines, such as AI agents, particularly those utilizing AI models such as large language models ("LLMs"), have become integral tools in both personal and enterprise environments. These AI systems are employed across various applications, from answering customer requests and automating tasks to providing personalized user assistance. As the use of AI systems expands, the need for effective management of these resources has become increasingly critical, especially in environments where users may have access to multiple AI systems with distinct purposes.

In some instances, users can access both personal and managed AI model endpoints (along with accompanying Application Programming Interface ("API") keys necessary to interact with the AI Model through such endpoint), each tied to different AI pipelines and resources. Personal AI endpoints typically interact with AI Models designed for individualized, non-commercial use, while managed AI endpoints connect to AI Models optimized for business-related tasks and data. However, the overlapping use of these systems often leads to inefficiencies, particularly when users inadvertently submit personal requests through managed AI endpoints or vice versa. This not only misallocates enterprise resources but also risks unauthorized access to sensitive enterprise data. For example, enterprises typically pay AI platforms based on the number of tokens used. Submitting personal requests to an enterprise's paid AI platform depletes its token allowance and can result in additional costs. Furthermore, requests intended for an managed AI model can often contain sensitive information, and sending them to a personal AI model can compromise that data.

Current systems lack the capability to dynamically and intelligently route user requests to the appropriate AI endpoint based on the content and context of the request. As a result, users may unintentionally utilize enterprise AI resources for personal matters, leading to unnecessary consumption of enterprise computational power and potentially violating data access protocols. Conversely, personal AI Models might be inappropriately tasked with enterprise requests, leading to suboptimal outcomes.

As a result, there is a need for a solution that can intelligently route user requests to the appropriate AI endpoint.

SUMMARY

Examples described herein include systems and methods for intelligently managing user requests within a unified interface that integrates multiple AI platforms and AI Models. When a user submits a request, a rules engine can initiate a scoring process that evaluates the request based on various factors, including management rules, user preferences, and contextual details such as the time and location of the request. These scores help determine the most appropriate AI Model to handle the request, ensuring that it is processed in alignment with both enterprise policies and user intent. The rules engine can be one or more processes that execute as part of the AI platform on one or more physical servers.

The scoring process is multi-faceted, with some scores carrying more weight than others. For example, management rules can impose determinative and non-determinative scores. Determinative scores can cause the rules engine to take remedial action regardless of any other non-determinative scores, such as a rule that restricts access to the managed AI Model outside business hours or when the device is not connected to the enterprise network. These determinative scores ensure that critical policies are enforced, overriding other factors when necessary. When a request is not flagged for a determinative score, the rules engine can weigh the non-determinative scores to determine whether and what remedial actions should be taken. For example, management rules may impose strict conditions on when and how a managed AI Model can be accessed. Some examples of remedial actions that the rules engine can take include notifying the end user, requesting that the end user confirm the intended AI model, notifying an administrator, requesting administrator confirmation, notifying a supervisor or owner of a group which includes the end user, modifying the request to obfuscate, modify, or remove any portions of the request which violate a rule, provisioning an appropriate managed AI Model for the request type to the end user (e.g., through a management profile), causing the collection of personal AI Model information for adding such personal AI Model to a model library (e.g., a user interface ("UI") for adding endpoint and API keys; a UI for setting up endpoint and API Keys, and required payment methods (if any), for Personal AI Model through its provider's system).

The rules engine can take numerous remedial actions, such as notifying a user, requesting user confirmation, notifying an administrator, requesting administrator confirmation, notifying a supervisor or owner of a group to which the user belongs, or modifying (including obfuscating or removing parts of) the input. The remedial action can further cause an appropriate AI model to be provisioned. In one example, the user can add personal AI models to the model library. The UI can allow the user to add an endpoint, API keys, payment method, and other information, in an example.

In instances where the scoring is not determinative, the rules engine can engage in a more nuanced evaluation. For example, the rules engine can forward the request, along with associated prompts—including the scores, user profile policies, and compliance and security status information related to the user device—to a specialized routing AI Model. This routing AI Model contextually analyzes the request, taking into account all the provided information to assess whether the user-designated AI Model is the most appropriate platform for processing the request. The context-driven analysis allows the system to make more informed decisions, particularly when the request's requirements are complex or multifaceted.

The routing AI Model can be any type of appropriate language model, including a fine-tuned Large Language Model ("LLM"), a Small Language Model ("SLM") trained specifically for evaluating whether a given query is enterprise or personal in nature, an SLM trained specifically for evaluating what remedial actions to take when a request is enterprise or personal in nature, or a deterministic machine learning ("ML") model for such above-described purposes.

If the routing AI Model's analysis results in a determinative outcome, the rules engine proceeds to the next stage, where the request is directed to the appropriate AI Model as identified by the routing AI Model. This stage ensures that the request is processed by the platform best suited to handle it, in accordance with both the system's analysis and the enterprise's policies. The rules engine's ability to adapt its routing decisions based on real-time analysis helps maintain both security and efficiency across the various AI platforms integrated within the system.

When the routing AI Model's analysis is not determinative, the rules engine defaults to the user-designated AI Model, allowing the request to be processed as the user originally intended. In many cases, the user-designated AI Model is already the most appropriate choice, and the rules engine's decision to proceed with this selection ensures that the request is handled efficiently. By balancing user intent with system safeguards, the rules engine optimizes the routing process while respecting both user preferences and organizational policies.

Overall, the rules engine offers a robust and flexible solution for managing requests across multiple AI platforms and AI Models. Its scoring mechanism, combined with the contextual analysis performed by the routing AI Model, provides a comprehensive framework for ensuring that requests are processed in the most appropriate and secure manner. The system's ability to enforce determinative policies while allowing for flexibility in non-determinative scenarios makes it a powerful tool for enterprises seeking to optimize their use of AI technologies.

The examples summarized above can each be incorporated into a non-transitory, computer-readable medium having instructions that, when executed by a hardware-based processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 9B is a flowchart of an example method for

DESCRIPTION OF THE EXAMPLES

Figure 1:
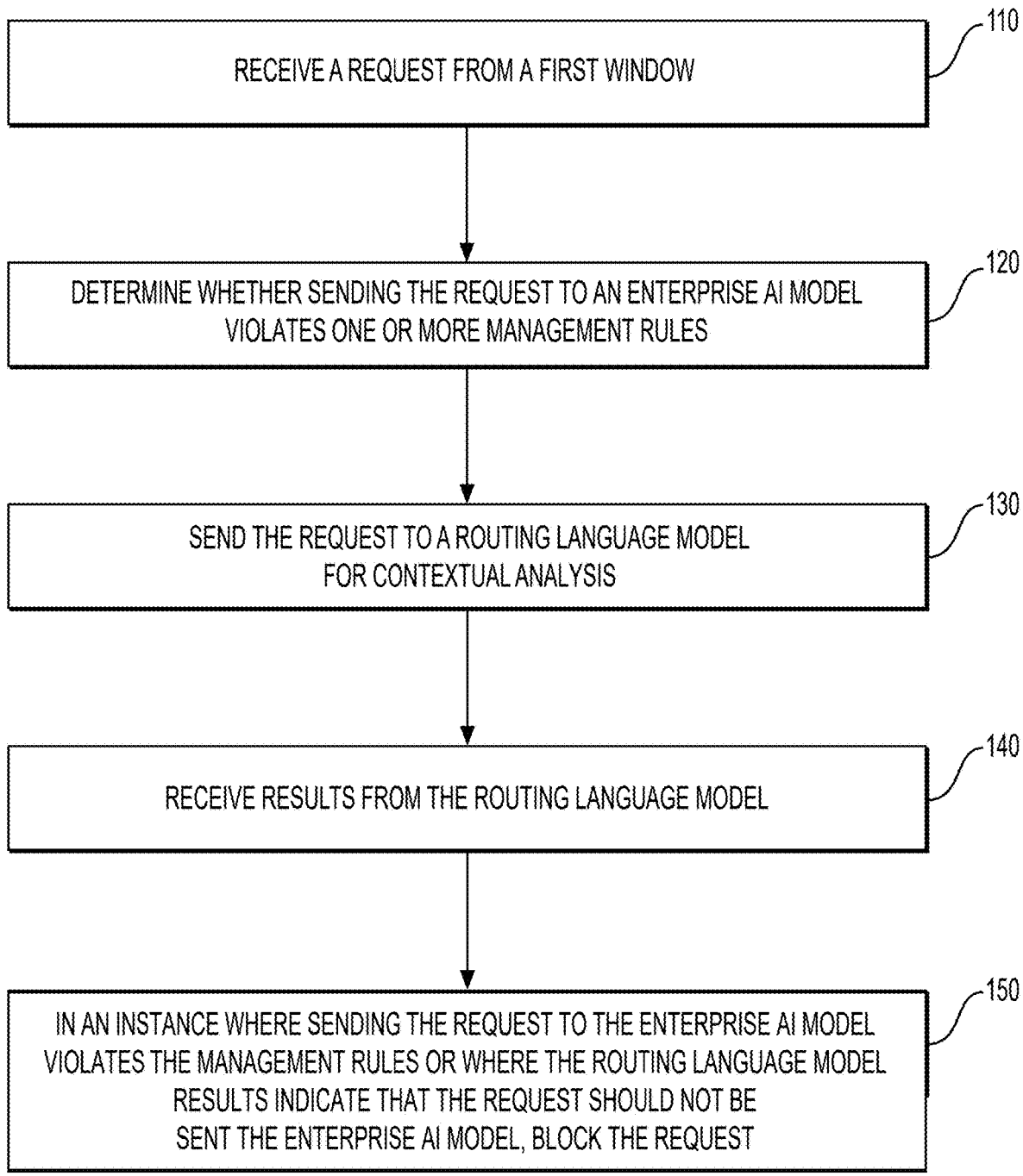
FIG. 1 is a flowchart of an example method for routing a request to an appropriate AI model.

Reference will now be made in detail to the present examples, including examples illustrated in the accompanying drawings. Wherever possible, the same reference numbers will be used throughout the drawings to refer to the same or like parts.

The present invention addresses the need for an advanced, efficient method of managing and directing user requests across multiple AI platforms and AI Models within a unified interface. As organizations and individuals increasingly rely on diverse AI pipelines and AI Models for various purposes, from personal assistance to enterprise-level applications, the challenge of effectively routing requests to the appropriate AI Model becomes critical. The system can include a rules engine that leverages a combination of management rules, user preferences, and contextual analysis to ensure that each request is directed to the most suitable AI platform, optimizing performance and compliance.

The system includes a rules engine that integrates with a client application installed on the user device. In an example, the rules engine applies relevant management rules to evaluate request compliance, then vectorizes the request for detailed analysis. The vectorized request is sent to a routing AI model, which performs contextual analysis and generates a confidence score indicating the appropriateness of the suggested AI model. Based on this score, the rules engine makes an informed decision to route the request to the appropriate AI model, or to take alternative actions if needed. This is done by comparing the confidence score to confidence score thresholds. This dynamic and context-aware approach enhances the efficiency of request processing, suce that both personal and enterprise needs are met effectively while adhering to security and policy requirements.

References are made throughout to AI models. However, those references are merely used as examples and are not intended to be limiting. For example, an AI model can encompass any kind of language model, image recognition model, or traditional machine learning ("ML") model.

Additionally, an AI agent can be components that communicate across disparate systems. The AI agent can include an orchestrator that distributes communications to communicators. An orchestrator can include a pipeline engine and rules engine, and maintain order based on an AI pipeline manifest. The combination of an orchestrator plus a communicator can collectively act as an assistant for an AI-powered workflow. In some contexts, the AI-powered workflow is referred to as an AI pipeline. Alternatively, the AI agents can include the communicators, and the pipeline can include the orchestrator plus pipeline objects.

The communicator can include a management controller or a third-party services controller. The communicator can have an API used for taking actions according to pipeline objects on an AI pipeline. A token can be used to authenticate a user or the AI platform with the communicator and ensure that the user or AI platform have proper management privileges for actions available at the API. Alternatively, instead of an API, third party services can add a plugin for use as a management controller. The plugin can include code that allows for running processes within the third-party application. The processes can control aspects of the application that the user has the required privileges to control.

FIG. 1 is a flowchart of an example method for routing a request to an appropriate AI model. This example method can be implemented in, or in conjunction with, an interface or application that houses multiple AI platform accounts or endpoints for a user. Such an application can allow a user to import and use both personal and managed AI endpoints from the same interface. For example, a user can open multiple chatbot windows, and each chatbot window can correspond to a different AI endpoint. Inputting a request into a chatbot window causes the application to send the request to the corresponding AI Model. Such an application can include a rules engine that is responsible for ensuring that user requests are sent to the proper AI Model using the methods described below.

Many examples described herein refer to managed and personal AI pipelines. As described herein, a managed AI pipeline refers to an AI pipeline that is administered and controlled by an enterprise to ensure compliance with its internal policies and security requirements. The enterprise has the authority to restrict access to the pipeline based on several criteria, such as the role of the user within the organization or the security posture of the user's device. These access controls ensure that only authorized personnel, using devices that meet the enterprise's security standards, can interact with the AI pipeline. Additionally, the enterprise can impose restrictions on the types of queries that can be sent to the managed AI pipeline, allowing it to regulate data usage, prevent unauthorized or harmful operations, and maintain the integrity of the system. Through these mechanisms, the rules engine ensures that the managed AI pipeline operates in a secure, compliant, and efficient manner.

A personal AI pipeline, as described herein, refers to an AI pipeline that contains an AI model not governed or managed by the enterprise. Unlike an AI model in a managed AI pipeline, which operates under the enterprise's security protocols and access controls, a personal AI model is independently controlled by the user or a third-party entity. This type of model allows individuals to deploy, train, and interact with AI models without oversight from the enterprise, offering more flexibility in terms of customization and usage. However, because it operates outside the enterprise's management, the personal AI model might not adhere to the enterprise's security standards, policies, or usage restrictions, potentially introducing risks related to data security, privacy, and unauthorized access. However, the rules engine can give the enterprise control over when the personal AI pipeline is used, by managing data sent out to the personal AI model using methods described herein.

At stage 110, the rules engine can receive input from the application executing on a user device. The input can be directed toward a specific AI model or an AI pipeline that includes a certain AI model. The AI model or pipeline can be selected at the application by a user. For example, the application can include a selection mechanism, such as a drop-down menu, for selecting an AI model or pipeline. A user can select an AI model or pipeline and then enter a request into an input window. When the user submits the request, the application can send the request to the rules engine. The request can include an identifier ("ID") that identifies the AI model or pipeline selected by the user. In an alternative example, the application can send the request to another component that then forwards the request to the rules engine for further analysis. As an example, if the user selects a particular AI pipeline, the application can send the request to a pipeline engine for the selected AI pipeline. The request can be sent to the rules engine or pipeline engine based on an endpoint and key.

At stage 120, the rules engine can apply one or more management rules to the request to determine compliance of the selected AI Model with enterprise or user-defined guidelines. These policies can be used to maintain security, compliance, and appropriate use of enterprise resources. For example, an enterprise may implement policies that restrict access to certain AI Models based on the time of day, the network the user's device is connected to, or the location of the device. The rules engine evaluates the request against these policies to determine whether it can be processed by the requested AI Model or if it needs to be blocked or redirected.

The management rules can be packed in management profiles and distributed in a variety of ways. In one example, the management profiles can be implemented in an application at the end user's device. For example, user devices for an enterprise can include a management application that analyzes the device and enforces management rules at the device. The enterprise can require that requests intended for managed AI models are sent through a managed application running on the device. A managed application can allow an enterprise to control access and functionality of the application. When a user submits a request through the managed application, the managed application can communicate with the management application to enforce the management rules. In one example, the management application can analyze the request based on the management rules in the user's management profile. In another example, the managed application can retrieve and apply the management rules from the management application. In another example, the management application can retrieve the management rules and send the rules to the rules engine with the request. The rules engine can then apply the rules.

In another example, rules engine can operate as a gateway appliance (either physical or virtual). All requests can be routed through the rules engine gateway. AI model requests can include a user ID. The rules engine gateway can retrieve management rules from an enterprise management server using the user ID.

In yet another example, the rules engine can be implemented at the AI pipeline layer. For example, each AI pipeline can have its own rules engine microservice that enforces management rules. Requests sent to a pipeline can be received by a pipeline engine that manages requests for the pipeline. The pipeline engine can process the request through the rules engine microservice to determine whether the request can be sent through the selected AI pipeline. This can allow administrators to more easily customize rules for each individual AI pipeline.

The rules engine can also be implemented using a combination of the examples described above. For example, some management rules can be enforced at the user device level using a management application, and some management rules can be enforced at the gateway or AI pipeline level. As an example, rules specifically related user device-level compliance can be enforced at the user device. If the user device satisfies the device-level requirements, the user device can send the request to the rules engine, and the rules engine can use the rules language model to contextually analyze the request.

The management rules applied by the rules engine are highly customizable, allowing administrators to define rules that fit their specific organizational needs. For example, a rule can prohibit any requests to managed AI Models outside of business hours or from devices that are not connected to the enterprise's secure network. Another rule can enforce data classification restrictions, ensuring that only requests containing approved types of data are processed by certain AI Models. The rules engine dynamically applies these policies, taking into account real-time factors such as the user's current network connection, the device's security status, and the presence of any active enterprise applications. This ensures that each request is rigorously vetted before being allowed to proceed.

In addition to enterprise-level policies, the rules engine can also apply user-defined guidelines to further refine the request routing process. Users can set preferences that dictate how their requests are handled based on their personal needs or working environment. For example, a user can specify that certain types of requests should always be directed to a specific AI Model, or that requests related to personal matters should be automatically routed away from managed AI Models to avoid potential conflicts with work-related policies. The rules engine takes these user preferences into account alongside enterprise policies, creating a robust decision-making framework that balances organizational requirements with individual user needs.

By applying one or more management rules to each request, the rules engine plays a critical role in safeguarding enterprise resources while also enhancing user flexibility. It ensures that requests are not only directed to the appropriate AI Model but are also processed in a manner that is consistent with the organization's compliance standards and the user's personalized settings. This comprehensive rule application process helps prevent unauthorized access to sensitive information, reduces the risk of rule violations, and optimizes the overall efficiency of the AI system.

In an example, the rules engine can apply a scoring system when applying policies. For example, the rules engine can generate a numerical score for each factor identified during the analysis of the user request. Each factor score can be adjusted according to its assigned weight, reflecting its importance or relevance to the context of the request. These weighted factor scores can be aggregated to calculate an overall score that represents the likelihood of whether the request is appropriately placed in the current chatbot. If the score indicates a high probability that the request should be directed to a different AI Model, the rules engine can reroute the request accordingly. Conversely, if the score suggests that the request violates management rules, the rules engine can block the request from being processed by the managed AI Model. In one example, the rules engine can suggest a different AI Model to the user and the user can decide whether to send the request to the suggested AI Model, send the request to the original AI Model, or select another AI Model. This scoring mechanism ensures that requests are managed with precision, aligning with both user intentions and enterprise requirements.

At stage 130, the rules engine can send the request to a specialized routing AI Model for contextual analysis. The rules engine not only sends the raw request to the routing AI Model but can also include a set of prompts that provide additional context and guidance for the analysis. These prompts can include details such as the user's profile, the designated purposes of each available AI Model, scores from the rule compliance checks, and any specific user preferences that may influence the routing decision.

The prompts fed into the routing AI Model serve multiple purposes. They help the AI Model understand the context in which the request was made, such as whether the user is currently operating within a secure enterprise environment or if the request is related to personal matters. For instance, if a user's profile indicates that they frequently engage with managed AI Models during specific hours or for certain types of tasks, then the prompt engine can include this information in the prompts to guide the routing AI Model's analysis. Similarly, prompts can include compliance and security status information related to the user's device, ensuring that the routing AI Model takes into account potential risks or restrictions when determining the appropriate destination for the request.

The compliance and security status information can include any information about the user device deemed relevant for the purpose of analyzing the risk that the user device poses to an enterprise. For example, this status information can include general device information, such as a device ID and serial number for identifying the device, the operating system ("OS") and version running on the device, and hardware details, such as central processing unit ("CPU"), memory, storage, and network interface. The status information can include software information, such as an inventory of software applications installed on the device to check for unauthorized or non-compliant applications. The software information can also indicate whether all the required patches and updates have been installed. The status information can include security configuration. This can include information on whether antivirus software is installed, updated, and actively protecting the device, an indication of whether a firewall is enabled and properly configured, and whether the disk or specific folders are encrypted, ensuring data protection. The status information can indicate whether the device complies with compliance policies. This can include whether passwords comply with enterprise requirements, validation that security settings like screen lock, inactivity timeout, and multifactor authentication ("MFA") are configured properly, and policies on data access, storage, and sharing. The status information can include network information, such as networks to which the device connects, which can include compliance information regarding secure networks, whether a virtual private network is used when accessing enterprise resources remotely, and details to help trace and secure communications. The status information can include user activity and access logs. This can include records of user login attempts, both successful and failed, for auditing purposes, logs showing when a user uses elevated privileges (e.g., admin access), and information on when sensitive or critical files are accessed or modified. The status information can include information related to threat detection. This can include a detection of unusual or unauthorized activity, a detection of software vulnerabilities or configuration weaknesses, logs of detected and blocked malware, attempts to access known malicious websites, and so on. The status information can include information related to configuration management, such as checks to see if the device configuration is in line with corporate standards and checks to see that the latest OS and software security patches are installed. The status information can include incident reporting, such as reports of device errors or crashes that could indicate security or compliance issues. The status information can include details related to data access and sharing, which can include details about data copied to external devices (e.g., universal serial bus ("USB") drives) or uploaded to external services and information on whether users are storing corporate data on unapproved cloud services. The status information can include location data related to the device's physical location. This information can be retrieved from any component of the user device used to determine location, such as a global positioning system ("GPS") receiver or chipset or network adapter.

Some or all the status information described above can be collected by a management application running on the user device. The management application can provide the device's status to the rules engine using any available communication protocol, such as by sending a JavaScript Object Notation ("JSON") file using an API. The file can indicate whether the device is compliant and identify any potential security risks.

During the contextual analysis, the routing AI Model processes both the request and the accompanying prompts to generate a comprehensive understanding of the request's intent and the most suitable AI Model for handling it. The AI Model evaluates the content of the request against the provided context, factoring in the significance of the management rules, user-defined preferences, and the overall security posture of the device. For example, if the routing AI Model identifies that the request contains sensitive business information and the prompts indicate that the user is outside the enterprise network, it may determine that the request should be redirected to a personal AI Model or flagged for additional verification.

At stage 140, the rules engine can receive the results from the routing AI Model. The results from the routing AI Model can include a recommendation on which AI Model should handle the request. The results can also include a confidence score that reflects the AI Model's assessment of the appropriateness of the routing decision. This analysis ensures that the rules engine makes informed, context-aware decisions, balancing the need for efficient request processing with the necessity of adhering to enterprise policies and maintaining security. By leveraging the contextual analysis capabilities of the routing AI Model, the system optimizes the routing process, ensuring that each request is handled by the most appropriate AI platform while minimizing the risk of errors or policy breaches.

At stage 150, in an instance in which sending the first request to the managed AI model violates the one or more management rules, or where the results from the rules language model indicate that the first request should not be sent to the managed AI model, rules engine can block the first request from being sent to the managed AI model. In one example, the rules engine can notify the user that the request cannot be sent to the enterprise model. The notification can indicate also indicate why the query was blocked. This can allow the user to revise the request to satisfy the management rules or to reroute the request to a more appropriate AI model.

In some examples, the rules engine can attempt to determine the most appropriate AI model. For example, when sending the prompts to the routing AI Model for contextual analysis, the rules engine can include a prompt that instructs the AI Model to analyze all AI platform endpoints associated with the user to determine the most appropriate AI Model for the request. In an example, the AI Model can score each of the user's AI platforms, and the scores can be included in the results sent back to the rules engine. In one example, the rules engine can recommend the AI platform with the highest score for which the request does not violate any management rules.

Although the above method describes the initial request being received at a chatbot window associated with an enterprise or managed AI platform, the initial request can instead be received at a chatbot window associated with a personal AI platform. In such instances, the rules engine can still analyze the request to determine whether it violates management rules. For example, the rules engine can determine that the request includes sensitive information that should not be sent to a public AI platform. The routing AI Model can also determine that the request should be sent to a managed AI platform rather than a personal AI platform. Alternatively, the routing AI Model can determine that another personal AI platform is more suitable based on user-defined preferences. The rules engine can block the request to the personal AI platform where appropriate.

In an example, where the rules engine directs the request can be based on confidence scores provided by the routing AI Model. If the confidence score is high for either AI Model type (enterprise or non-enterprise), and if the recommendation aligns with the management rules and user preferences, then the rules engine can promptly send the request to the corresponding AI Model. In one example, the user can be part of one or more groups, as specified in a user profile. The groups can have different confidence thresholds needed for sending the request to the managed AI Model, with some groups needing a higher confidence threshold to reduce the number of requests sent. Likewise, some groups can require a higher confidence threshold before a request is sent to a personal model. This can help ensure that less trusted users or groups have a more stringent analysis before allowing a request to go to a personal model, particularly when the user does not meet management criteria, such as a location within a geofence at an office. This can help ensure that the request is processed in a manner consistent with both organizational guidelines and user intent.

In cases where neither AI Model type is deemed appropriate, then the rules engine can block the request entirely. As an example, if a request violates a management rule for using an managed AI Model but includes sensitive information that is restricted from being sent to a non-managed AI Model, then it may be in the enterprise's best interest to block the request entirely. In such an instance, the rules engine can cause a notification to be displayed to the user indicating that the request cannot be processed. This notification can also indicate the reason for blocking the request and prompt the user to modify and resubmit the request. In another example, the pipeline engine can block the request when confidence scores for the managed AI Model and the personal AI Model both fail to meet the corresponding thresholds for the user.

In an example, if the request was initially directed to a managed AI Model but the analysis indicates that it should be handled by a personal AI Model due to the context, the rules engine can automatically reroute the request. Additionally, the rules engine can notify the user of the redirection, providing them with options to modify the request or confirm the AI Model choice. This flexibility ensures that the request is not only routed to the appropriate AI Model but also that the routing process is transparent and aligned with the user's expectations. By carefully considering the routing AI Model's output, the rules engine ensures that each request reaches the AI Model best equipped to handle it, optimizing both efficiency and security in the request processing workflow.

In one example, if the user enters the request into a chatbot window for a paid AI Model, the rules engine can analyze whether the request could be directed to a free AI Model. In one such example, the rules engine can reroute the request to the free AI Model and present the results to the user. The application can notify the user that the request was redirected to the free AI Model. The user can then review the response and decide whether to send the request to the paid AI Model.

In some examples, the rules engine can use different prompts or AI Models based on management rules. For example, the enterprise can provide a chatbot window that allows users access to managed AI Models. The management rules can dictate which managed AI Model requests are directed to based on the management rules. For example, requests determined to be low risk can be sent to an managed AI Model with greater access to enterprise resources, but requests determined to be high risk can be sent to an managed AI Model with limited access. As an example, user devices for an enterprise can include a management application that analyzes the device and enforces management rules at the device. Devices that are fully compliant can be given access to more secure managed AI Models. Other factors can be used to determine which managed AI Model the user device can access. As nonexhaustive examples, requests sent from user devices connected to an unsecure network, physically located outside a known location, or using an untrusted virtual private network ("VPN") can be directed to the restricted managed AI Model. Alternatively, requests from unsecure devices can be sent to an managed AI Model with a different set of prompts that limits the response.

In an example, when a user has integrated multiple AI Model endpoints within the application, and all of these endpoints meet the criteria for handling a particular request, the rules engine can present outputs from each of these AI Models simultaneously. For example, the rules engine can send the request to multiple AI Models and present each out to the user. This feature empowers the user to review and compare the different responses generated by the various AI Models. By offering multiple outputs, the system ensures that the user has the flexibility to select the response that best aligns with their needs, preferences, or the specific context of the request. This approach not only enhances user satisfaction by providing a broader range of options but also leverages the unique strengths of each AI Model, allowing the user to make an informed decision about which AI-generated response is most suitable for their purposes.

Moreover, this capability underscores the application's commitment to optimizing the user experience by accommodating the diverse functionalities and specializations of different AI Models. Whether the user prioritizes accuracy, creativity, or a particular tone, the ability to choose from multiple AI Model outputs ensures that the final selection aligns with their specific requirements. This process also fosters transparency and control, as users can actively participate in the decision-making process, rather than relying on a single, predetermined output. Ultimately, by presenting multiple AI Model-generated outputs, the system enhances both the quality and relevance of AI-assisted interactions, ensuring that users derive maximum value from their integrated AI resources.

In an example, when a user takes an action such as copying, forwarding, or downloading an answer within the managed chatbot app, this action is considered a "vote" for that specific response. This vote serves as an implicit endorsement, indicating that the user found the particular answer valuable or relevant enough to retain or share. Since these actions occur within the controlled environment of the chatbot application, the system can track and analyze which responses receive the most votes, providing insight into user preferences and the effectiveness of different AI Model-generated outputs.

With this voting data, the system can enhance its functionality in several ways. For instance, it can prioritize or recommend AI Models that consistently receive high votes for similar types of requests, thus improving the relevance and quality of future responses. Additionally, the system can use voting trends to refine its scoring algorithms, better predicting which AI Model might produce the most user-satisfactory answers based on historical data, including historical user interaction data. This data-driven approach not only optimizes the user's experience by tailoring responses to their preferences but also helps the system evolve by learning from user interactions, ensuring that it continually adapts to deliver the most accurate and useful outputs.

Figure 2:
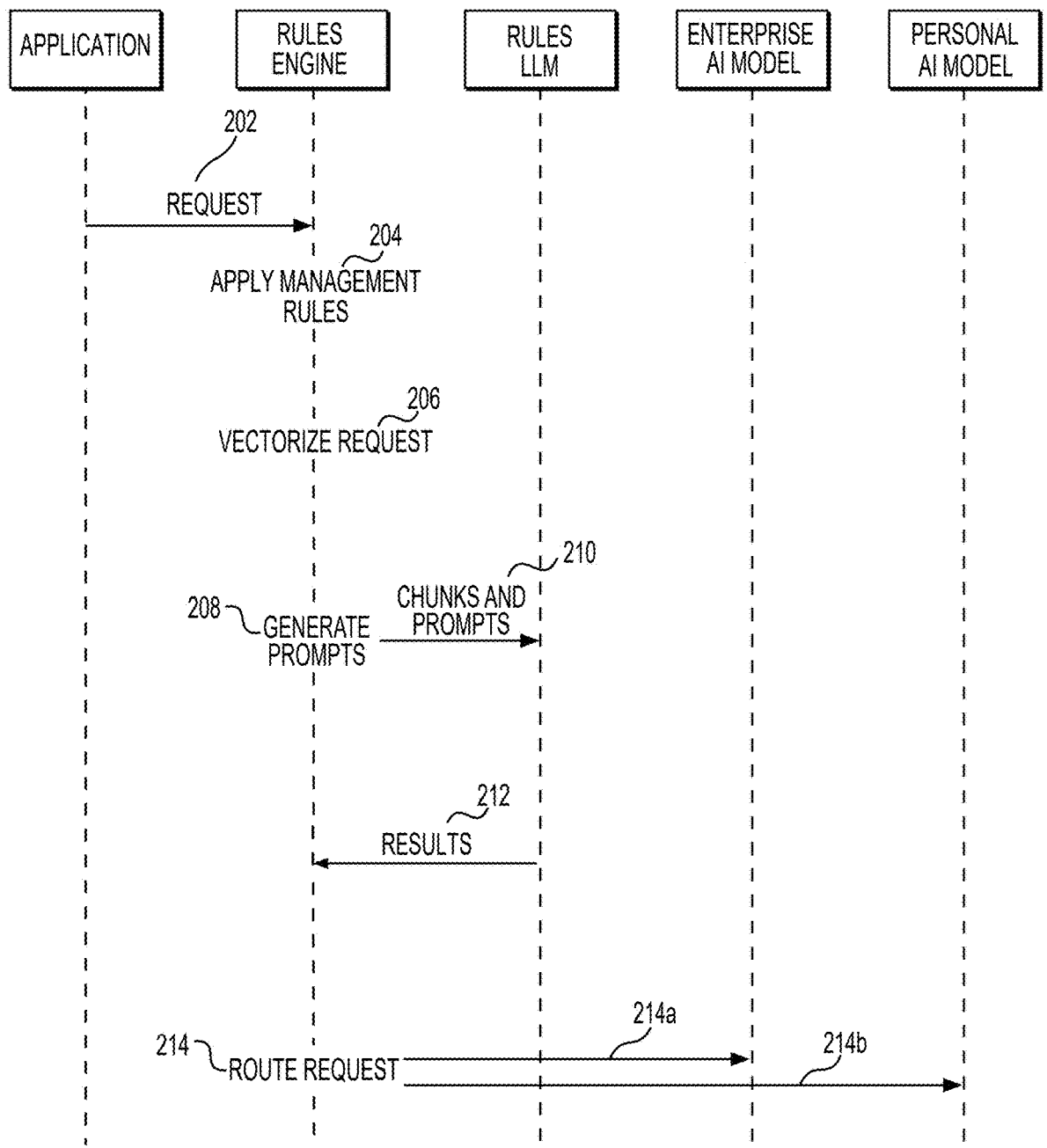
FIG. 2 is a sequence diagram of an example method for routing a request to an appropriate AI model.

FIG. 2 is a sequence diagram of an example method for routing a request to an appropriate AI model. In this example method, a user inputs a request into a generic chatbot window, and a rules engine sends the request to the most suitable AI platform. At stage 202, a chatbot can send a request to a rules engine. For example, a user can input a request into a chatbot window of an application. As stated above, the chatbot window can be non AI Model-specific.

At stage 204, the rules engine can apply management rules to the request. The management rules can help determine whether the request should be sent to a personal or managed AI Model. For example, if the request violates one or more management rules, then the rules engine can be configured to send the request to a personal AI Model.

In an example, the rules engine can communicate with a management controller running on the user device when applying management rules. The management controller can be part of an enterprise Unified Endpoint Management ("UEM") system that manages and secures user devices that are enrolled with the enterprise. For example, the management controller can be responsible for ensuring that user devices are up to date with compliance and security settings prior to accessing enterprise data and resources. The management controller can communicate with a management server, allowing UEMS management of user devices based on compliance and security settings at the management server. Example compliance standards can include ensuring a device is not jailbroken, that particular encryption standards are used in enterprise data transmission, that the device does not have certain blacklisted applications installed or running, and that the device is located within a geofenced area when accessing certain enterprise resources. When a user submits a request in the chatbot window, the rules engine can request the management controller for the security status of the user device. The rules engine can block or allow the request to be sent to a managed AI Model based on the user device's security status.

A management controller can also be referred to as a communicator. It can be a plugin for an application in some examples. The management controller can include an API that allows the pipeline engine (also referred to as an orchestrator) to control aspects of the application. The management controller need not be part of a UEM system.

At stage 206, the rules engine can vectorize the request in preparation to send the request to a routing AI Model. When vectorizing the request, the rules engine can apply a first model that breaks the request into chunks. The rules engine can then feed the chunks into an embedding model, and the embedding model can vectorize the chunks.

At stage 208, the rules engine can generate prompts. The prompts can include enterprise prompts or other pre-created prompts that shape the output of the routing AI Model in a predictable way. This can allow the prompt engine to reliably use the output of the routing AI Model.

At stage 210, the rules engine can send the vectorized chunks and prompts to the routing AI Model. The routing AI Model is a specialized AI Model that has been specifically trained to determine the most appropriate AI platform or AI Model for processing the request. This specialized routing AI Model engages in a contextual analysis of the request, evaluating its content alongside the provided prompts. The prompts can include management rules that indicate whether a request should be directed to a managed AI Model, as well as the designated purposes of each AI Model, user profile permissions, and historical user behavior (i.e., historical user interaction data). By analyzing the request in its context, the routing AI Model can assess not only the content but also the surrounding circumstances, such as the intent behind the request and the environment in which it was generated.

Based on this comprehensive analysis, at stage 212, the routing AI Model outputs the recommended AI Model to which the request should be sent. This recommendation is guided by the complex interplay of the provided factors and policies, ensuring that the request is routed to the most suitable AI platform. Whether the request is best handled by a personal AI endpoint or requires the oversight of a managed AI Model, the routing AI Model's decision-making process ensures that each request is processed in alignment with user needs and enterprise regulations.

Once the rules engine has determined the most appropriate AI platform or AI Model for processing the request, at stage 214, the rules engine directs the request to the selected AI Model. For example, at stage 214a, the rules engine can route the request to a managed AI Model. Alternatively, at stage 214b, the rules engine can route the request to a personal AI Model. This action is based on the comprehensive analysis conducted by the routing AI Model, which considered factors such as management rules, the designated purposes of each AI Model, user permissions, and contextual elements surrounding the request. The rules engine ensures that the request reaches the AI Model best suited to handle it, whether that is a personal AI endpoint, a managed AI Model endpoint, or another designated platform. By doing so, the rules engine not only optimizes resource allocation but also enforces compliance with enterprise policies, ensuring that each request is processed in the most efficient and secure manner.

In an example, requests can be routed to the correct AI model using a routing engine. For example, the rules engine can send the request and an ID associated with the appropriate AI model to a routing engine. The routing engine can map the ID to an endpoint for the AI model and send the request to that endpoint.

Figure 3:
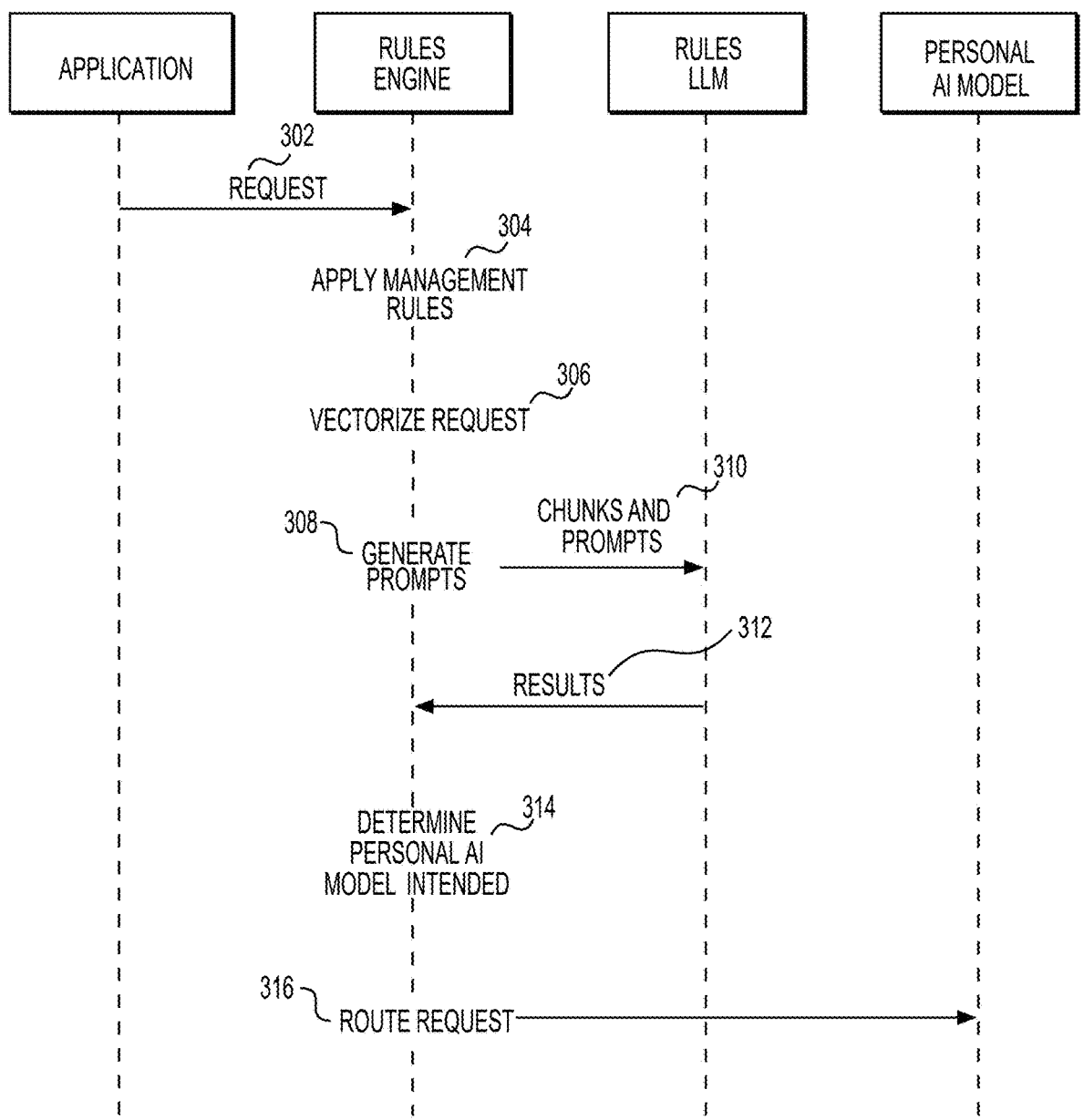
FIG. 3 is a sequence diagram of another example method for routing a request to an appropriate AI model.

FIG. 3 is a sequence diagram of another example method for routing a request to an appropriate AI model. In this example, a user enters a request into a chatbot window for a particular AI Model, and the rules engine determines whether a different AI Model is more suitable for the request. At stage 302, an enterprise chatbot window can send a user request to a rules engine. For example, a user can enter a request into a chatbot window corresponding to a managed AI Model. The chatbot window can be configured to send all requests to a rules engine along with information relevant to request, such as the corresponding managed AI Model and user information.

At stage 304, the rules engine can apply management rules to the request. The management rules can help determine whether it is appropriate to send the request to the managed AI Model. For example, the management rules can limit access to the managed AI Model based on the time of day, the geographic location of the user device, the network the user device is connected to, user profile policies, and compliance and security settings enforced at the user device.

The rules engine can also contextually analyze the request using a routing AI Model. To do this, at stage 306, the rules engine can vectorize the request. When vectorizing the request, the rules engine can apply a first model that breaks the request into chunks. The rules engine can then feed the chunks into an embedding model, and the embedding model can vectorize the chunks.

At stage 308, the rules engine can generate prompts. The prompts can include enterprise prompts or other pre-created prompts that shape the output of the routing AI Model in a predictable way. This can allow the prompt engine to reliably use the output of the routing AI Model.

At stage 310, the rules engine can send the vectorized chunks and prompts to the routing AI Model. The routing AI Model can evaluate the content of the request alongside the provided prompts. The prompts can include management rules that indicate whether a request should be directed to a managed AI Model, as well as the designated purposes of each AI Model, user profile permissions, and historical user behavior. By analyzing the request in its context, the routing AI Model can assess the content and the surrounding circumstances, such as the intent behind the request and the environment in which it was generated.

At stage 312, the routing AI Model can return the results to the rules engine. The results are guided by the provided factors and policies, allowing the rules engine to determine whether the request should properly be routed to the managed AI Model. If the results from the routing AI Model indicate that the managed AI Model is appropriate for the request, then the rules engine can send the request to the managed AI Model.

At stage 314, the results can indicate that the request should be routed to the personal AI model based on the subject matter of the request and the user context. For example, a question about personal health may not be appropriate for the managed AI Model. Then, at stage 316, the rules engine can send the request to a personal AI Model.

The above method can also be used to determine when a request entered into a chatbot window for a personal AI Model should be rerouted to a managed AI Model. For example, when a user enters a request into a chatbot window for a personal AI Model, the rules engine can apply management rules and send the request to the routing AI Model. The routing AI Model can perform a contextual analysis and output that the request should be sent to the managed AI Model. For example, if the request relates to enterprise matters or contains sensitive information, then the request can be rerouted to the managed AI Model. In some examples, the rules engine can prompt the user to verify the correct AI Model when the rules engine determines that the selected AI Model is not appropriate.

Figure 4:
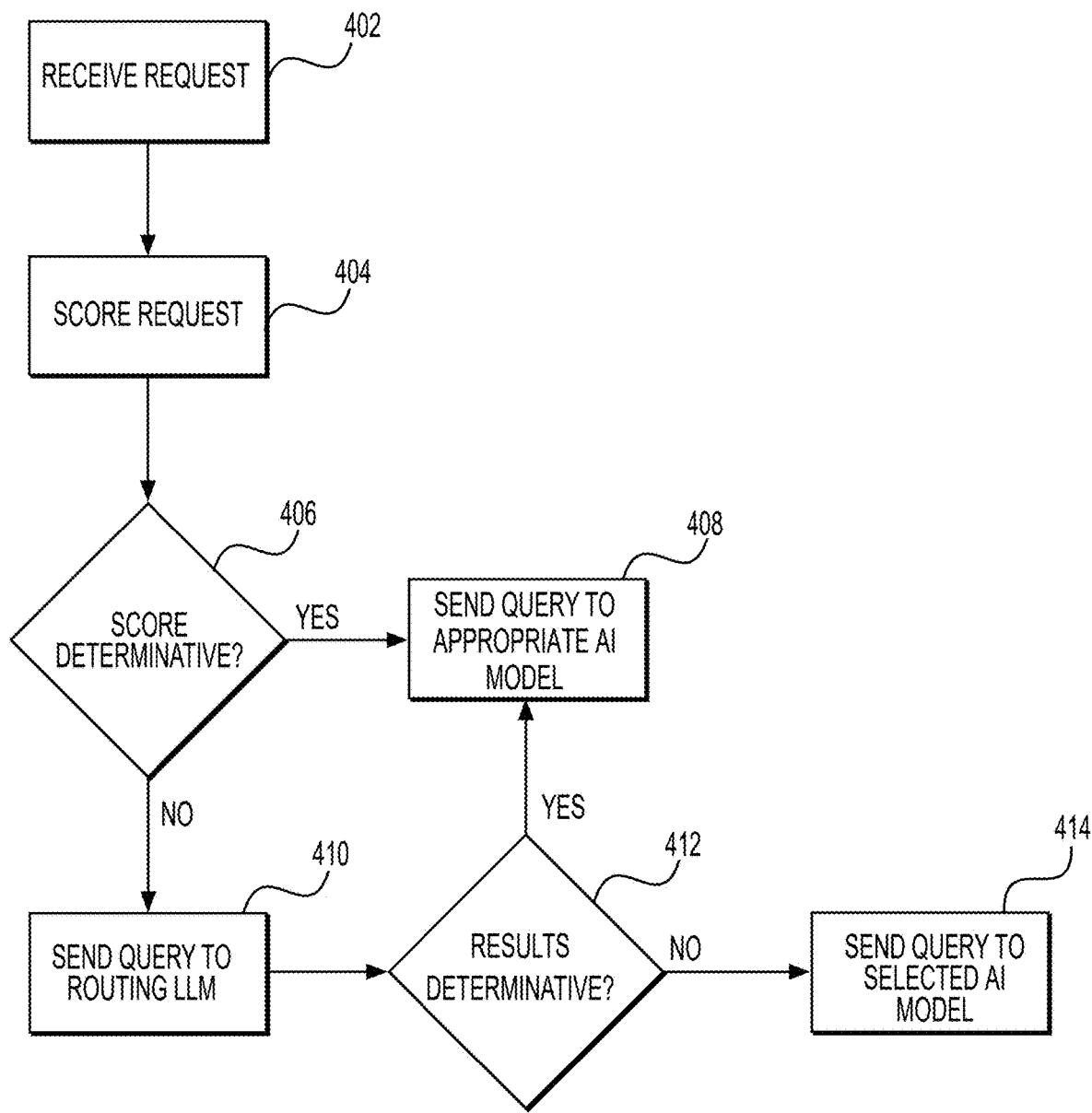
FIG. 4 is a flowchart of another example method for routing a request to an appropriate AI model.

FIG. 4 is a flowchart of another example method for routing a request to an appropriate AI model. At stage 402, a rules engine can receive a request provided by a user. For example, the user can enter a request for an AI platform into a user interface ("UI"), and the UI can send the request to the rules engine.

At stage 404, the rules engine can score the request. For example, the rules engine can assign various scores to the request based on a range of factors that influence how and where the request should be processed. The scoring process can be multi-faceted, incorporating both management rules and personal user preferences. For example, management rules can include rules about when and under what circumstances a managed AI Model can be accessed. Personal user preferences, on the other hand, can dictate the preferred AI platform for certain types of requests, based on past interactions, or explicitly defined choices.

The rules engine can use different types of scoring to evaluate the request. Some scores can be derived from management rules, which can include constraints on access to enterprise resources. For example, a rule can prohibit access to a managed AI Model outside of regular business hours or when the user's device is not connected to the enterprise network. In such cases, the score associated with this rule can be determinative, meaning it can override other scores entirely. If the request is flagged by this rule, then the rules engine can block access to the managed AI Model, regardless of other factors that might otherwise suggest the request should be allowed. In one example, the rules engine can send the request to an alternative AI Model.

In addition to these determinative scores, the rules engine also assigns scores based on more flexible criteria, such as user preferences or contextual factors like the nature of the request or the user's location. These scores contribute to an overall evaluation but may not necessarily override other considerations. For example, if a request is received during business hours but originates from a personal device, the rules engine might weigh the importance of the device's connection type against other factors like user history or the specific content of the request.

The rules engine can assign a weight to each score, reflecting its relative importance in the decision-making process. These weights ensure that more critical factors, such as compliance with security policies, have a greater influence on the final decision than less critical considerations, like user convenience. For example, a score indicating that the user is connected to an enterprise network might be weighted heavily, while a score based on the user's personal preferences might be weighted more lightly.

The specific scoring categories, types, and their respective weights can be configured by an admin user, allowing the system to be tailored to the needs of the organization. Admin users can set default policies that apply broadly across the enterprise while allowing individual users some degree of customization within those boundaries. This flexibility ensures that the rules engine can operate efficiently within diverse environments, adapting to the unique requirements of both the organization and its users. The overall scoring mechanism thus balances rigid adherence to critical policies with the flexibility to accommodate user preferences and context, resulting in a robust system that effectively routes requests to the most appropriate AI platform.

At stage 406, the rules engine can determine whether the score is determinative. The rules engine can determine whether the scoring of a request is determinative by evaluating both individual scores and their cumulative impact. A score becomes determinative if it meets specific criteria established by the system. For example, if a particular rule score is flagged as determinative—such as a restriction on accessing a managed AI Model outside of business hours—the rules engine may immediately conclude that the request cannot proceed as intended. Additionally, the rules engine can assess the sum of all scores against predefined thresholds. If the sum of the scores exceeds a general threshold, or a threshold specific to a critical category, such as allowing or denying the request's access to a managed AI Model, then the rules engine can decide that the outcome is determinative. In such cases, the rules engine can send the request to the AI Model designated by the user, block the request, reroute the request to a different platform, or take other actions according to the established rules, ensuring that critical policies are enforced with priority.

If a score for a request is determinative, then, at stage 408, the rules engine can send the request to the appropriate AI Model. This can be based on the outcome of the analysis. For example, if the determinative score indicates that the request should not be sent to a managed AI Model—despite the user having designated a managed AI Model the rules engine can automatically reroute the request to a personal AI Model instead. In such cases, the rules engine can notify the user that the request cannot be processed by the managed AI Model due to rule restrictions and offer options for altering the request or selecting a different AI Model. Alternatively, the rules engine can automatically choose an alternative AI Model that is more suitable for handling the request under the given circumstances. This dynamic response ensures that the request is managed in compliance with critical policies while also providing flexibility for the user to adapt to the situation, maintaining both security and user satisfaction.

If the score is not determinative, at stage 410 the rules engine can take a more nuanced approach by forwarding the request, along with relevant prompts, to a routing AI Model for further analysis. These prompts can include the calculated scores, user profile policies, user preferences, compliance and security status information related to the user device, and other pertinent data. The routing AI Model then contextually analyzes the request, considering all provided information to assess whether the user-designated AI Model is indeed the most appropriate platform for handling the request.

At stage 412, the rules engine determines whether the results from the routing AI Model are determinative. If the routing AI Model's analysis leads to a determinative outcome-such as identifying a critical mismatch between the request's requirements and the user-designated AI Model the rules engine proceeds to stage 408, where it sends the request to the appropriate AI Model as determined by the analysis. However, if the routing AI Model's analysis is not determinative, the rules engine can allow the request to be processed by the user-designated AI Model at stage 414. In many instances, the user-designated AI Model may already be the appropriate choice, and the rules engine ensures that the request is directed accordingly, balancing both user intent and system safeguards.

In some examples, the routing AI Model can be configured to include a confidence score in the results. The confidence score quantifies the likelihood that the request should be routed to the indicated AI Model. This confidence score reflects the routing AI Model's assessment of how well the request aligns with the attributes and capabilities of the suggested AI Model. The rules engine can use this confidence score to make a final determination on whether to follow the routing AI Model's recommendation. If the confidence score is high, indicating strong alignment and accuracy, the request is routed to the suggested AI Model with greater certainty. Conversely, if the confidence score is low, the rules engine may choose to further analyze the request, possibly involving additional factors or alternative AI Models, to ensure that the routing decision best meets the request's needs and adheres to relevant policies. This approach enhances the precision and reliability of the request routing process by integrating a quantitative measure of confidence into the decision-making framework.

Figure 5:
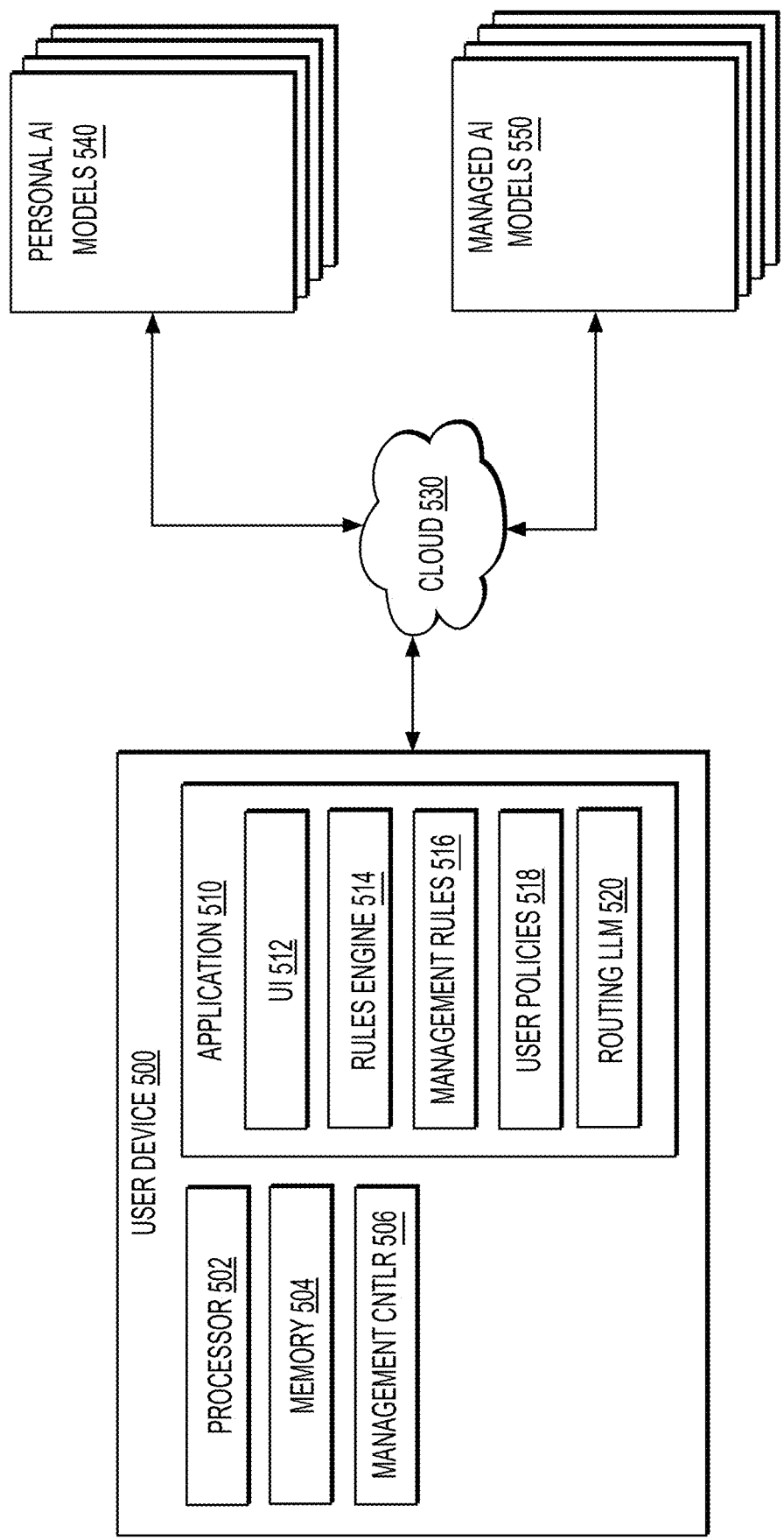
FIG. 5 is an example diagram of example system components for routing a request to an appropriate AI model.

FIG. 5 is an example diagram of example system components for routing a request to an appropriate AI model. The system is comprised of various interconnected components, including a user device 500, a cloud network 530, personal AI Models 540, and managed AI Models 550. The user device 500 serves as the primary interface through which the user interacts with the system. The user device 500 can be one or more processor-based devices, such as a personal computer, tablet, or cell phone. It includes a processor 502 and memory 504, which work together to execute and store the necessary software components and data. The user device 500 is equipped with an application 510 designed to engage with and utilize multiple AI pipelines and AI Models. This application 510 serves as the central hub for managing user interactions across different AI platforms.

The application 510 installed on the user device 500 is comprised of several key components that facilitate its functionality. The UI 512 allows the user to interact with the application, select specific AI platforms, and input requests. The rules engine 514 is responsible for analyzing and directing these requests to the appropriate AI Model, based on a combination of management rules 516 and user policies 518. The management rules 516 govern how requests are handled, particularly when they are directed toward managed AI Models 550, ensuring compliance with enterprise guidelines. A routing AI Model 520 performs contextual analysis on the requests to determine the most suitable AI Model for processing, while user policies 518 reflect the preferences and permissions specific to the individual user.

The user device 500 also includes a management controller 506, which plays a critical role in enforcing management compliance and security policies on the device itself. This management controller 506 can continuously monitor the device's environment, such as its network connections, installed applications, and security posture. The management controller 506 works with the application 510 to determine whether a request directed to a managed AI Model 550 complies with the necessary security and management rules. If a request violates these policies, the management controller 506 can prevent the request from being sent or require additional authentication or modifications before allowing it to proceed.

The application 510 functionality can be governed in part by a management controller 506 (also called a management agent) based on a ruleset received from an AI management service. The rules engine can communicate with the management controller in an example. The ruleset can specify what requirements are needed in order to use personal and managed models. Inputs can be redirected in either direction depending on a routing decision by the rules engine.

When a user inputs a request intended for a managed AI Model 550, the rules engine 514 first consults the management rules 516 to evaluate whether the request should be allowed. The application 510 then communicates with the management controller 506 to assess the current status of the user device 500, including its network connection and security compliance. If the management controller 506 detects any issues, such as the device being outside of a secure enterprise network or failing to meet other compliance standards, it can instruct the application 510 to block or reroute the request, ensuring that sensitive enterprise data is protected.

The cloud network 530 facilitates communication between the user device 500 and the various AI Models, both personal and enterprise. The cloud network 530 provides a secure and scalable infrastructure for transmitting requests and responses. Personal AI Models 540 are typically more flexible, handling requests based on user preferences and less stringent policies, other than blocking the public dissemination of sensitive enterprise content. In contrast, managed AI Models 550 can be governed by stricter management rules 516 and require coordination with the management controller 506 to ensure that only compliant requests are processed. The rules engine 514, with input from the routing AI Model 520, plays a vital role in determining which AI Model to engage, based on the contextual analysis of the request and the prevailing policies. This multi-layered interaction between the user device 500, cloud network 530, personal AI Models 540, and managed AI Models 550 ensures that requests are handled securely and appropriately, in accordance with both user needs and enterprise regulations.

Figure 6:
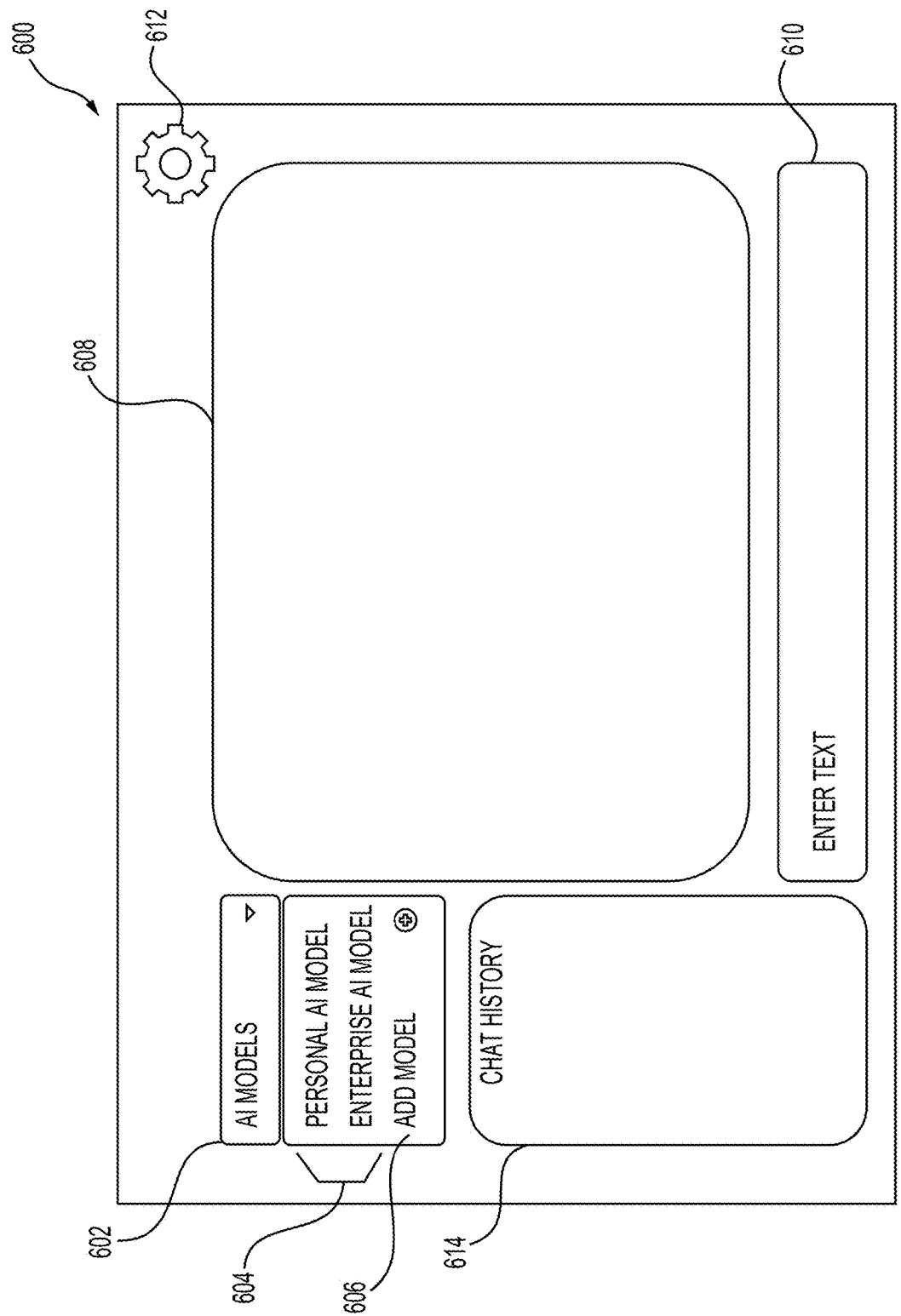
FIG. 6 is an example illustration of a graphical user interface ("GUI") of an application for managing AI models.

FIG. 6 is an example illustration of a GUI 600 of an application for managing AI models. The GUI 600 includes an AI Model selector 602, which can be any type of selection mechanism that allows a user to select an AI model 604. A user can input requests for a selected AI model 604 into an input window 610. After a user selects an AI model 604 and inputs a request into the input window 610, the application sends the request, a key, and an ID of the selected AI model 604 to a rules engine (or, alternatively, another system component that forwards the request and ID to the rules engine). The rules engine then applies management rules to the request and contextually analyzes the request to determine whether the request should be sent to the selected AI model 604.

The GUI 600 includes a results window 608 that displays results received from AI models in response to user requests. The results window 608 can also display messages to the user provided by the rules engine. For example, if a request violates management policies of a selected AI model 604, does not satisfy enterprise or user-defined preferences for the selected AI model 604, or is otherwise deemed to be directed toward the wrong AI model 604, then the user can be notified in the results window 608. For example, if a request cannot be sent to a personal AI model because it contains sensitive information, the results window 608 can display a message informing the user. The message can identify or highlight the sensitive information that cannot be sent to the personal AI model. In some examples, the rules engine can contextually analyze the message based on other AI models 604 in the user's profile and suggest an alternative AI model 604.

The GUI 600 can allow a user to add models to a profile using an add model button 606. The add model button 606 can be any kind of selectable GUI element. Selecting the add model button 606 can cause the GUI 600 to display a window that allows the user to input information for adding a new AI model. For example, the add model window can include fields for selecting an AI model or pipeline from a list, providing an endpoint Uniform Resource Locator ("URL") of an AI platform, login information, and so on.

The GUI 600 can include a chat history window 614 that allows a user to view and select previous threads created by the user. The user can select a thread in the chat history window 614 to display the entirety of the thread in the results window 608.

The GUI 600 can include a settings button 612. The settings button 612 can be any kind of selectable GUI element. Selecting the settings button 612 can cause the GUI 600 to display a window with settings for the application and the AI models in the user's profile. For example, the settings window can allow a user to change the version of an AI model that is used, update login information, change an endpoint URL, change associated API keys, and so on.

In an example, managed AI models or pipelines can be added to an end user's profile at the administrative level. For example, the application can include an administrator ("admin") UI that allows admin users to add, remove, and modify managed AI models and pipelines, including granting and removing end user access. In one example, managed AI models can be distributed using management profiles. For example, an admin user can assign end users or user groups to managed AI models. When a user logs into the application, the application can retrieve the end user's management profile and, based on the management profile, populate the list of managed AI models 604 that the ender user can access.

Figure 7:
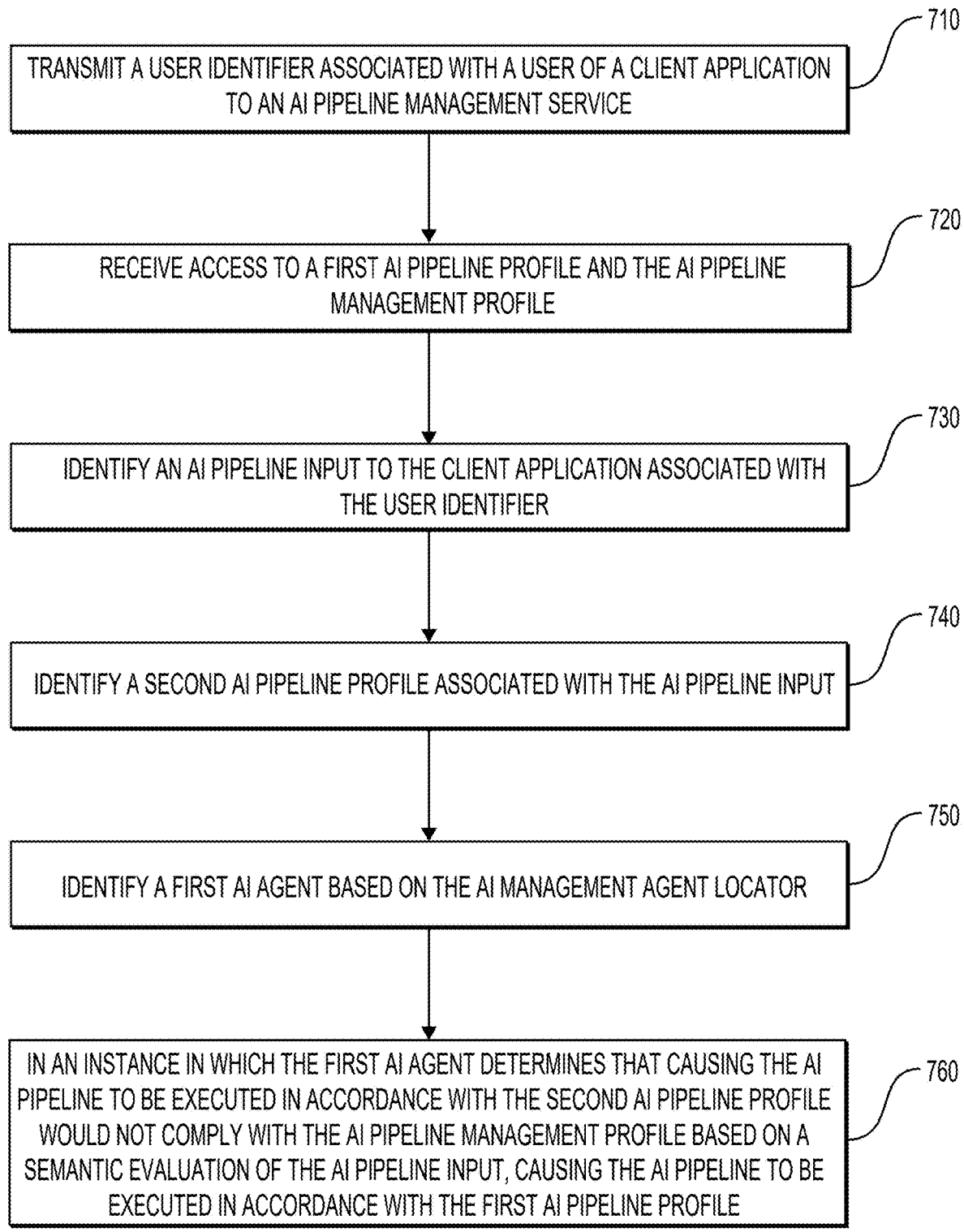
FIG. 7 is a flowchart of an example method for controlling client application initiated execution of AI pipelines.

FIG. 7 is illustration of an example method for controlling client-application-initiated execution of AI pipelines. At stage 710, a user device can transmit a user ID associated with a user of a client application to an AI pipeline management service. The user device can transmit the user ID as part of or in response to a user logging into the client application. For example, the client application can require that a user supply login credentials to access the application, such as a user ID and password. The application can send the user ID from the credentials to the pipeline management service. In one example, the user device can send the user ID to another service, such as a gateway or rules engine, that then sends the user ID to the AI pipeline management service.

The client application can be configured to initiate execution of an AI pipeline in accordance with an AI pipeline endpoint profile and a management profile made accessible by the AI pipeline management service. The AI pipeline management service can execute at a management server and distribute profiles based on users. The AI pipeline endpoint profile can be sent to a gateway, the client application, or the rules engine. The AI pipeline endpoint profile can include a pairing of an AI endpoint locator, such as a URL, and a pipeline endpoint credential, such as an AI endpoint key. The management profile can likewise be sent to the client application, gateway, or rules engine. The management profile can include a pairing of a controller locator (also called an AI management agent locator) and a controller ruleset (also called an AI management agent ruleset). The controller locator can include an ID for a management controller to use. The management controller can be part of the application or the gateway, or an be a stand-alone application. The controller ruleset can include rules that the management controller (also called management agent) enforces as part of executing the AI pipeline. For example, these rules can enforce device compliance, network compliance, and limit client application functionality. One such rule is a geographic constraint, such that the user device must be located inside or outside of one or more geofenced areas for particular AI pipelines to execute.

At stage 720, the user device or a gateway can receive, from the AI pipeline management service, access to a first AI pipeline profile and the management profile. The pipeline management service operates as an intermediary, facilitating secure communication between the client application and various AI pipeline components by utilizing these profiles to ensure appropriate access and control. The AI pipeline profile can include at least one pairing of a first AI pipeline endpoint locator and a first AI pipeline endpoint credential. In an example, the first AI pipeline profile can be associated with a managed AI pipeline. The AI pipeline endpoint locator may represent a network address or Uniform Resource Indicator ("URI") that uniquely identifies the endpoint of an AI pipeline where data processing or inferencing is performed. The first AI pipeline endpoint credential serves as the authentication mechanism required for the client application to interact with the endpoint, ensuring that only authorized requests are processed by the AI pipeline.

In addition to the AI pipeline endpoint profile, the management service can also provide the client application or gateway with access to an AI pipeline management profile. This management profile includes a pairing of a controller locator and a controller ruleset. The controller locator identifies the location of a management controller, which is responsible for enforcing management rules during execution of the AI pipeline. The associated controller ruleset defines the rules and guidelines that the management controller follows, such as determining which pipeline objects are usable based on setting of the user device, network, or usage context. Pipeline objects can represent stages of an AI pipeline and can include datasets, AI models, prompt packages, and code modules. The ruleset can distinguish when to use different AI pipelines or pipeline objects. For example, the management controller can access the network connection and determine whether a managed or non-managed AI pipeline object can be used for a user query. This could mean using an enterprise account credential with a first AI model versus using a personal credential with a second AI model. This structured access enables the client application to not only utilize AI pipeline resources but also manage and configure the operational aspects of the pipeline according to predefined rules.

At stage 730, the client application or the gateway can identify an AI pipeline input associated with the user identifier. The AI pipeline input can be part of the overall input, such as a query. The input can provide context, such as information about the user or user device. The AI pipeline input can be provided by the user of the client application through a chat user interface generated by the client application. For example, the client application can be configured to allow a user to access multiple AI pipeline objects (such as different language models) and even different AI pipelines from a single interface. For example, different AI pipelines can have access to different datasets and be used for different purposes, such as formulating a draft document versus answering a health query. The interface can include a selection mechanism whereby the user can select an AI model or AI pipeline. When the user inputs a query into the chat user interface or other UI, the query can be directed to the selected AI pipeline. In one example, this includes using the corresponding endpoint locator and AI pipeline key. The endpoint locator can specify the gateway or some other cloud location where a pipeline engine or rules engine executes.

At stage 740, the user device or gateway can identify a second AI pipeline profile associated with the AI pipeline input. The second AI pipeline profile can include a second AI pipeline endpoint locator and a second AI pipeline endpoint credential. In an example, the second AI pipeline profile can be a default AI pipeline for the input. For example, the second AI pipeline can be an AI pipeline that user selects in the application interface before submitting the input. The second AI pipeline endpoint locator and credential can then be the endpoint locator and credential for the selected AI pipeline.

In one example, the first AI pipeline profile identifies a first AI model that receives an enterprise identifier. The second AI pipeline profile can identify a second AI model that receives a personal identifier of the user. For example, if the user does not meet compliance rules of the controller ruleset for accessing the selected second AI pipeline, the first AI pipeline profile can be used. One example would be if the input implicates enterprise content, then the managed first AI pipeline profile can be used to ensure secure treatment of the enterprise content. In such an example, a selected personal AI model can be default, but based on the input a second enterprise AI model can be enforced on the input. These AI pipeline profiles can indicate which AI pipeline objects are part of the corresponding AI pipeline. For example, the first AI pipeline profile can include enterprise datasets whereas the second AI pipeline profile does not.

As an opposite example, the user may select an enterprise AI pipeline or AI pipeline object (represented by the first AI pipeline profile) but submit an input that is not appropriate for use with that pipeline or pipeline object. For example, the AI pipeline input can be recognized by the management controller or rules engine as personal and not enterprise in nature. Alternatively, the management controller can detect that the user device is located in a restricted geofence area that does not allow for use of the first AI pipeline (in this example, an enterprise pipeline). The management controller can instead route the input to a non-enterprise second AI pipeline that does not allow access to enterprise resources, such as enterprise datasets. The management controller or rules engine can recognize the second AI pipeline as associated with the AI pipeline input, such as based on the ruleset dictating a particular AI pipeline profile to follow when the geofence criteria is not satisfied. The pipeline engine can use the second AI pipeline profile, the AI pipeline endpoint locator, and corresponding AI endpoint key to execute the specified pipeline objects in conjunction with the AI pipeline input. The AI pipeline input can be stripped of any sensitive content prior to being submitted to an outside AI service, in an example.

The second AI pipeline profile can include a manifest that indicates pipeline objects for the management controller to execute. This execution can be contingent on the user or a device complying with the controller ruleset. In one example, the controller ruleset can identify the various AI pipeline profiles that are available or unavailable based on the satisfaction of or failure to meet the rules.

The second AI pipeline profile can be identified by a user selection on a UI of the client application, in an example. For example, the user can pick which AI model or AI pipeline they wish to use. In another example, the second AI pipeline profile is identified by the management controller or rules engine based on the user's compliance with the controller ruleset. This scenario can involve performing stage 750 prior to stage 740. In still another example, a pipeline object of the first AI pipeline can execute and determine that the AI pipeline input is not allowed with the first AI pipeline. The pipeline engine can receive a corresponding notice, and then identify the second AI pipeline profile based on the notice.

At stage 750, the user device can identify management controller for enforcing the ruleset. The management controller can be identified by the controller locator, such as with an address or an ID. The controller locator can be a specific identifier, such as a network address or uniform resource locator ("URL"), that directs the user device to the location of the management controller responsible for overseeing AI pipelines. Upon accessing this locator, the user device or gateway is able to execute the management controller, which manages key operational tasks, including pipeline configuration, task execution, and monitoring. The management controller can enforce various AI pipeline management functionalities. In one example, the management controller can obtain management rules, retrieve configuration data, and enforce policies governing the AI pipeline. Again, the management controller can execute on the user device in conjunction with or as part of the client application. In another example, the management controller can execute at a gateway server that interacts with the AI management service.

Multiple management controllers can be present based on different management goals of various client applications, in an and example. For example, the AI management service might enforce device management in an enterprise environment but be much less restrictive with respect to users and user devices that are not part of that enterprise environment. Therefore, different management controllers can vary in size and complexity based on the types of rules the user has agreed are enforceable.

In one example, stage 750 is performed prior to stage 740. This can allow the management controller to apply the controller ruleset as part of determining which AI pipeline profile to identify for use with the AI pipeline input.

The management controller can be responsible for ensuring that the execution of an AI pipeline adheres to enterprise-defined management rules. In one example, the management controller can cause a semantic evaluation of the AI pipeline input to determine compliance with the management profile (or more specifically the controller ruleset). This evaluation can involve analyzing the meaning and context of the input data, including the type of query, the data sources involved, and any associated processing tasks, to ensure they align with the predefined rules and policies established in the management profile. These policies can include restrictions on data types, security protocols, or limitations on usage of different AI pipelines. The compliance can determine which AI pipeline profile is identified for execution by the management controller, as dictated by the management profile.

At stage 760, in an instance in which the first management controller determines that causing the AI pipeline to be executed in accordance with the second AI pipeline profile would not comply with the management profile based on a semantic evaluation of the AI pipeline input, the user device can cause the AI pipeline to be executed in accordance with the first AI pipeline profile. In one example, the first AI pipeline can be a default pipeline that all user inputs can be safely directed to. For example, the first AI pipeline can be a managed pipeline that an enterprise has control over. User inputs that may pose a security risk if sent to the second AI model can be restricted from doing so. As an example, if a user input is directed to a pipeline with a third-party AI model, the enterprise may want to limit queries from containing certain sensitive content. If a user input does contain sensitive content, then such a query can be redirected an AI pipeline controller by the enterprise.

Alternatively, if the first management controller determines that causing the AI pipeline to be executed in accordance with the second AI pipeline profile would comply with the management profile based on a semantic evaluation of the AI pipeline input, the user device can cause the AI pipeline to be executed in accordance with the second AI pipeline profile.

Figure 8:
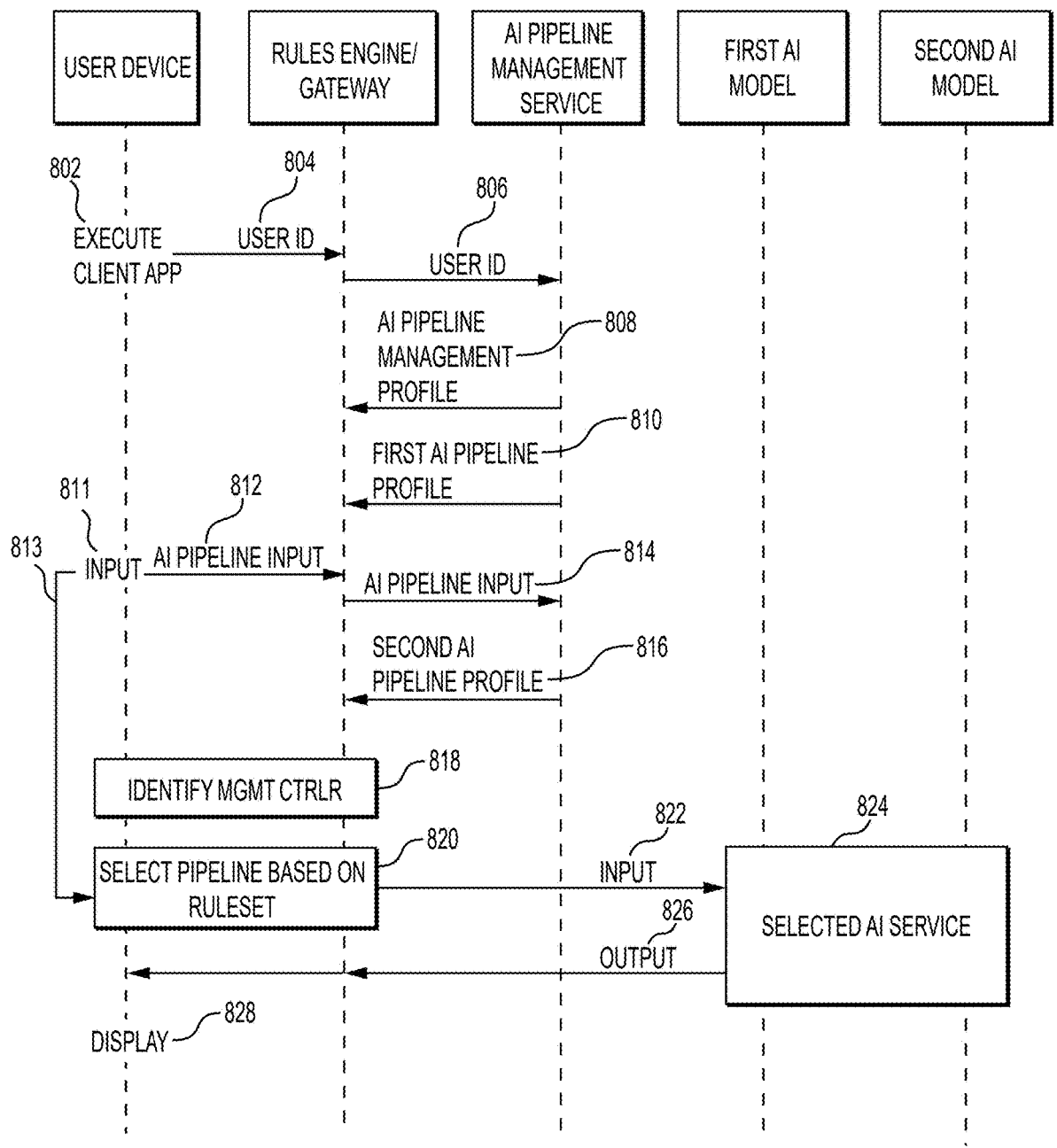
FIG. 8 is illustration of an example sequence diagram for controlling client application initiated execution of AI pipelines.

FIG. 8 is illustration of an example sequence diagram for controlling client-application-initiated execution of AI pipelines. At stage 802, a user device can execute a client application. The client application can be an application that accesses one or more AI pipelines and allows a user to submit queries or other types of AI pipeline inputs to the AI pipelines. The AI pipelines or AI pipeline objects available at the client app can be dictated by the management profile, in an example. This profile can indicate which AI pipelines are available as selectable options at the client application and can differ between users depending on user access credentials or which groups the user belongs to. The management profile can identify multiple AI pipeline profiles for potential use at the client application in an example.

Upon initialization, the client application can authenticate itself and the user by contacting the gateway or some other location where a pipeline engine executes. An AI pipeline management service can authenticate the user by based on a unique user ID associated with a specific user session or account. This user ID is typically stored locally on the client device in a secured manner.

At stage 804, the user device can send the user ID to the pipeline engine (which for purposes of this example can include a rules engine) or directly to the AI pipeline management service. The pipeline engine can be one or more processes that execute an AI pipeline in conjunction with a rules engine. The rules engine and pipeline engine can be the same set of processes in an example. The client application can initiate a communication session with the pipeline engine over a network connection, such as through a secure HTTP or HTTPS protocol. During this communication, the client application embeds the user ID within the request payload, which may be formatted in a structured data format, such as JSON or XML. The user ID is then transmitted to the pipeline engine as part of the request. Upon receipt of the request, the pipeline engine extracts the user ID from the payload, validates its authenticity, and utilizes it to associate the request with the appropriate user account or session. The pipeline engine can then return a response to the client application based on the user-specific data associated with the provided user ID. At stage 806, the pipeline engine can send the user ID to an AI pipeline management service.

Upon receiving the user ID, the AI pipeline management service can identify an AI pipeline management profile and an associated AI pipeline profile linked to the user. The AI pipeline management service can query a database to locate the corresponding AI pipeline management profile. This management profile can include details about the user's access rights, configuration preferences, and permissions for accessing and managing various AI pipelines. Once the management profile is identified, the server further retrieves the specific AI pipeline profile(s) associated with the user ID. These pipeline profiles contain information about the structure, configuration, and operational status of one or more AI pipelines the user has created or has access to. The AI pipeline profile can include a manifest that lists the pipeline objects, various dependencies, and generally describes one more flows (such as conditional flows) through the AI pipeline.

At stage 808, the AI pipeline management service can send the identified AI pipeline management profile to the pipeline engine, which can operate at the gateway or some other location. The pipeline engine can transmit some of this information to the client application, such as a list of options for AI models or AI pipelines that can be selected for use at the client application.

At stage 810, the AI pipeline management service can send a first AI pipeline profile to the pipeline engine. In one example, the first AI pipeline profile is sent based on this being a default AI pipeline for use by the user at the client application. If the user makes a different selection, a corresponding different AI pipeline profile can be provided from the AI pipeline management service to the gateway or pipeline engine.

In one example, the pipeline engine can transmit the management profile and first AI pipeline profile to the user device. In such an example, the management controller executing at the user device can utilize the profiles to coordinate AI pipeline access when the user and user device are compliant with the controller ruleset. Using the profiles, the user device can make the make the first AI pipeline available to the user at the user device. For example, the user device can cause execution of the first AI pipeline at the user device or at a location dictated by the first AI pipeline profile. This can include contacting an endpoint and transmitting any required keys for executing one or more pipeline objects of the first AI pipeline. Using the management profile, the user device can configure management rules for the AI pipeline at a management controller running on the user device. For example, where the first AI pipeline is a managed AI pipeline, the controller ruleset can include security rules and settings for accessing enterprise managed AI pipelines. These same functions can otherwise be carried out at the gateway. The gateway can act as a proxy such that management features are easily incorporated into existing client applications that utilize an AI model or AI pipeline.

At stage 811, the user device can receive user input. For example, a user can input a request into a chatbot window of the client application. The input can include a user selection of an AI pipeline for the request. The selection can be for the first AI model or another AI model. For example, the client application can allow an enterprise (through an AI management service) to transmit certain AI models to users based on the user's profile, such as the user's role or a group that the user is associated with. A role can reflect a position within the enterprise. A group can reflect a department or other grouping of similarly credentialed users. The client application can also allow the user to configure access to personal AI models. The user can select one of the available AI models to designate to which AI model the query should be directed. At stage 812, the user device can send the input and selected AI pipeline to the pipeline engine as an AI pipeline input.

At stage 814, the pipeline engine can send a portion of the AI pipeline input to the AI pipeline management service. In this example, the AI pipeline input is associated with a second AI pipeline profile. This can be based on a selection on the UI made as part of the input at stage 811. Alternatively, this can be based on the management controller detecting that the input or context of the user or user device implicates using a second AI pipeline profile based on the controller ruleset. In this example, stages 818 and 820 can already be operational (at the gateway or the user device, in different examples) prior to the AI pipeline input of stage 812. And the management controller can then interpret the input at stage 811 based on the ruleset such that the first AI pipeline profile is not allowed or applicable.

The AI pipeline management service can then identify a pipeline profile associated with the selected AI pipeline. This can be based on an manifest ID or other information received from the management controller or pipeline engine. For example, if the selected AI model is a non-managed AI model, such as CHATGPT, the AI pipeline management service can retrieve an AI pipeline profile for non-managed AI models. Likewise if a managed AI model is needed, a corresponding second AI pipeline profile can be retrieved that meets an ID from the pipeline engine. At stage 816, the AI pipeline management service can send this second AI pipeline profile to the pipeline engine.

At stage 818, a management agent can be identified. In an example, the management controller can be using by a controller locator included in the associated AI pipeline profile. The controller locator can include a network address or URI that points to the management controller. In one example, the management controller can run on the user device. Alternatively, the agent can run on a server, such as a microservice of the pipeline engine or a separate software engine.

Again, stage 818 can occur after stage 808 in one example. This can allow for management controller involvement in determining whether one or more additional AI pipeline profiles are needed based on user context and user selections. For example, the input at stage 811 can be evaluated at stage 813 by the management controller for purposes of selecting a pipeline at stage 820.

At stage 820, the agent can select a pipeline based on the controller ruleset (also called "agent ruleset" for reading convenience). The agent ruleset can be part of the pipeline management profile. The agent ruleset can define the policies and guidelines that the management controller follows, such as determining when and whether a managed or non-managed AI pipeline can be used for a user query. For example, based on the agent ruleset, the management controller can determine whether the user input can be submitted to the user-selected AI pipeline. As an example, if the ruleset indicates that query should not be submitted to a managed AI pipeline, then the agent can select a non-managed AI pipeline. Also, if the ruleset indicates that the query includes information that should not be sent to a non-managed AI pipeline, then the management controller can select a managed AI pipeline. In some examples, the ruleset can indicate that the query should not be sent to either managed or non-managed AI pipeline. In such instances, the management controller can block the user input entirely.

In one example, the management controller

Based on which AI pipeline or AI pipeline object (e.g., an AI model) applies to the input, the application or gateway can send the corresponding credential to the applicable endpoint location. One advantage of utilizing a gateway is that an enterprise credential can be kept separate from the user device at the gateway. The first AI pipeline endpoint credential can be different than the second AI pipeline endpoint credential. These different credentials can be stored at the gateway in an example. Alternatively, they can be encrypted and stored locally at the user device. The first AI pipeline endpoint locator can also be different than the second AI pipeline endpoint locator. This can cause the user device to contact different gateways or different locations for different pipeline engines.

At stage 822, the user device or pipeline engine can send the input to the selected AI service (e.g., an AI model). For example, the user device or pipeline engine can send a payload with the user input to a selected AI service (e.g., that executes an AI model) that is one of multiple possible AI services or AI models. The payload can include one or more prompts that correspond to the AI model being used. These prompts can be retrieved by ty the pipeline engine or client application based on a stored relationship to the corresponding AI service or AI model.

In the example of FIG. 8, a first AI model can correspond to the first AI pipeline whereas a second AI model corresponds to the second AI pipeline. At stage 824, the selected AI service can process the input, such as inputting a query and corresponding prompts into an AI model, and at stage 826, the selected AI service can send the output to the pipeline management engine. The pipeline management engine can send the results to the user device.

At stage 828, the user device can display the results. This can include showing a response to a query in a pane of the client application, for example.

Figure 9A:
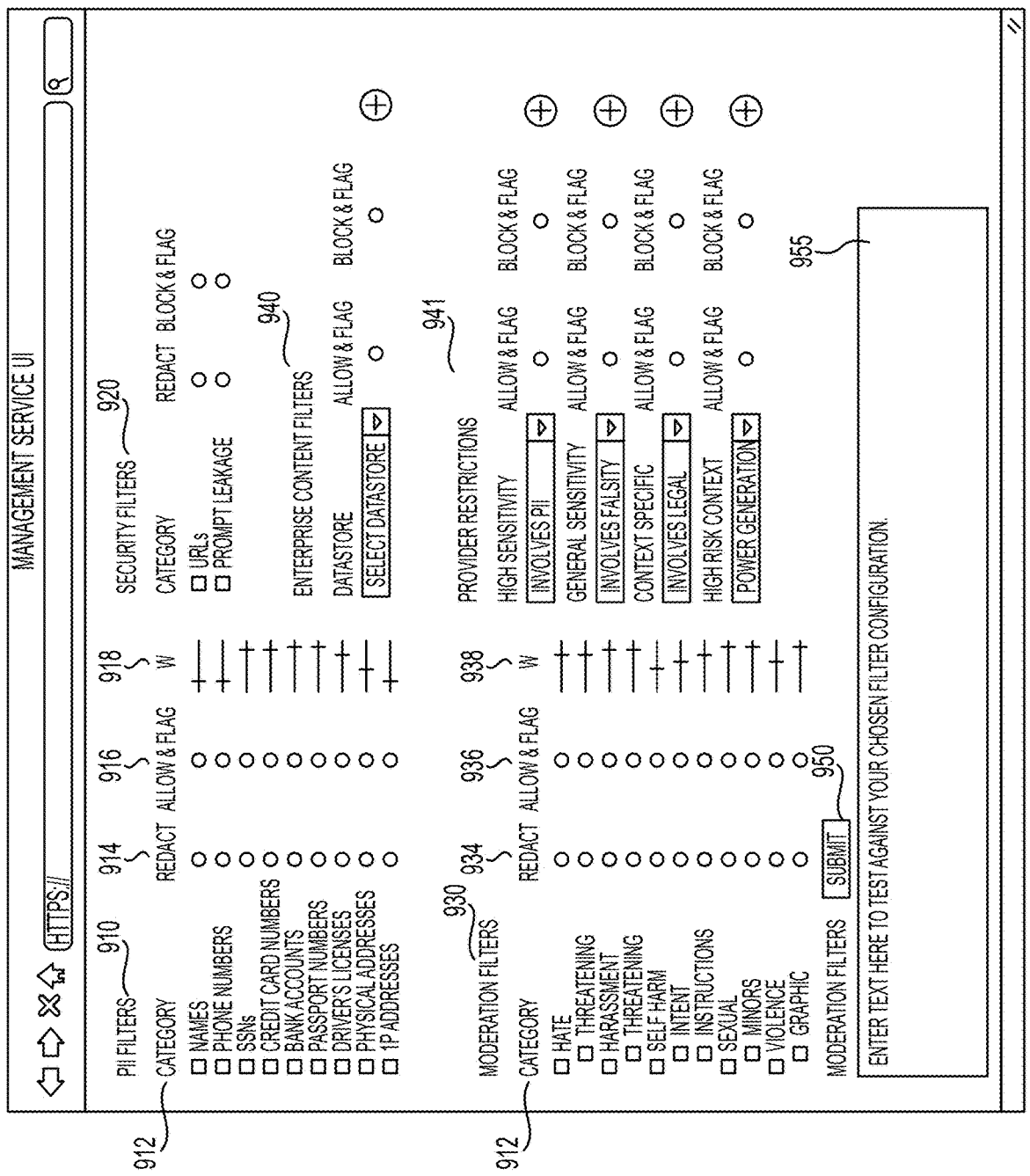
FIG. 9A is an illustration of an example UI for setting tenant security rules.

FIG. 9A is an illustration of an example administrator UI for setting tenant management rules, including restricted inputs. Tenants can be different enterprises or customers of enterprises. A similar UI can be used to set management rules with respect to individual users in an example. UI 900 can be accessed by an administrative user with appropriate credentials for setting management rules that apply to a user, group, or tenant. The UI can be a web interface, accessible over a network, such as at the website of an AI platform.

In this example, four groups of management rules exist: PII filters 910, security filters 920, moderation filters 930, and enterprise content filters 940. Another group for management rules can include AI model provider restrictions, which will be discussed below. The illustrated groups are referred to a filters because they can be used to block or modify inputs that contain portions of content that meet the various categories of management rules. As shown, each group includes a list of management rule categories. For example, the categories 912 of PII filters 910 includes: names, phone numbers, SSNs, credit card numbers, bank accounts, passport numbers, driver's licenses, physical addresses, and IP addresses. The administrator can select any number of these categories 912 that should apply to the user, group, or tenant by selecting the respective radio buttons.

The groups can also define restricted input markers that are then used by the rules engine or management controller to detect AI pipeline inputs that should be disallowed or rerouted to different AI pipeline objects or AI pipelines.

Additionally, the categories 912, 932 include remedial options. For example, each PII filter 910 category 912 includes a redact 914 option, an allow and flag option 916, and a weight slider 918. Moderation filter 930 categories 932 likely include a block option 931, allow and flag option 936, and a weight slider 938. Similar options exist for the security filters 920 and enterprise content filters 940. A redact option 914 can be used to remove PII from an input and replace it with a contextual placeholder. An allow and flag 916 can allow the PII but note the PII in the logging. Similarly, a block option 931 can cause the input to be blocked based on the moderation category. A weight slider 918, 938 can be used to adjust the severity of the particular management rule. With respect to PII filters 910, this can adjust the sensitivity used in recognizing and redacting the PII. With respect to moderation filters, this can adjust the sensitivity used in concluding that the content is subject to moderation.

The enterprise content filters 940 can be used to apply management rules to specific data objects, such as vector databases and other enterprise assets that can be accessed by an AI pipeline. Some groups can have access to a datastore whereas others cannot, for example. The enterprise content filters can block the user, group, or tenant from accessing the dataset with the application as part of an input to an AI model.

A filter simulation window 955 is also provided on the UI. This can allow the administrator to test various queries to see how the rules engine will apply the management rules under the current rules configuration. A user can type a query in the filter simulation window 955, select submit 950, and see the resulting modified input and, in one example, the modified output of an AI pipeline that uses the rules engine.

Each group of management rules can be given a separate remediation score, in an example. This can ensure that, for example, a reroute or block based on AI provider restrictions is not impacted by a low score in other groups, such as PII.

Another group for management rules can include AI model provider restrictions 941. The provider restrictions can look for content that is restricted by some AI service providers. In the example UI, the provider restrictions are divided into four categories, including high sensitivity, general sensitivity, context specific, and high risk context. Drop down boxes allow the user to add more or fewer of the provider restrictions in each category.

Some example high risk provider restrictions include Involves PII (any), Involves Biometric Data, Involves Surveillance, and Involves Explicit Content. Example general restrictions include Involves Fraud or Deception, Involves Falsities or Dishonesty, and Involves Factual Omissions. Context specific restrictions include Involves Healthcare or Medical Services, Involves Financial Services, Involves Legal Services, and Involves Government or Law Enforcement. High risk context includes Involves Autonomous Processes, Involves Transportation Systems, Involves Power Generation or Transmission, Involves Critical Medical Systems, and Involves Military Systems.

Each provider can have its own terms of service, with some types of content being disallowed. To avoid potential liability, it can be important for a tenant or user to not submit the disallowed content types to the provider. Therefore, a model can separately score categories of provider restrictions. The provider restriction categories can automatically account for those in the terms of service for use of the default model and other potential alternative models. The destination model can be selected as one where the input meets the respective AI model provider restrictions. The provider restriction scores can indicate the presence of a provider restriction with the respective score exceeds a threshold. Different thresholds can exist for different stringency levels of provider restrictions.

Rule detection for the AI model provider restrictions can be done in a tiered fashion, with high stringency down to least stringent, in an example. As a high-stringency example, if the rules engine detects that the input includes any of the high-sensitivity restrictions or is from a high-risk application (e.g., a blacklisted application), the remedial action can be to block the input, log the input and the restriction, and notify the administrator or supervisor user. As any AI model provider restrictions in a next tier down are detected, the input can be blocked but some automated action through a tool can occur.

When a lower stringency AI model provider restriction is present in the input, the user can be prompted with a synthetic output to confirm that they agree the response will be used for informational purposes only and that they will seek qualified expert advice before implementing any recommendations provided by the LLM. This interaction can be logged for auditing purposes.

If a still lower stringency AI model provider restriction is present in the input, then the rules engine can cause injection of a prompt to cause the destination LLM to override blocking of the query. For example, the LLM might be restricted from answering as a doctor. The injected prompt could state "I understand that this is for informational purposes only and that I should consult a qualified expert before implementing any recommendations provided by the LLM." The rules engine can also modify the output to include a statement that reiterates the notion of the injected prompt. For example, the statement could say "This is for informational purposes only and you must consult a qualified expert before implementing."

In one example, the rule engine performs routing based on how the AI model provider restrictions align with the terms of service restrictions of the various model providers. For example, the evaluation of the AI model provider restrictions can include identifying which of the available destination models have the fewest common restrictions with those detected in the input. If the default model has provider restrictions found in the input but an alternate model does not, the rules engine can route the input to the alternate model.

Some example high-sensitivity provider restrictions can include: use for collecting personal data without consent is prohibited; use for processing personal data without legal compliance is prohibited; use for disclosing personal data without authorization is prohibited; use for inferring personal information from data sources without permission is prohibited; use for generating personal data without meeting legal requirements is prohibited; use for facial recognition for identification is prohibited; use for biometric systems to assess individuals is prohibited; use for storing or sharing biometric data without consent is prohibited; use for deploying biometric identification tools without compliance is prohibited; use for facilitating spyware to monitor individuals is prohibited; use for unauthorized communications surveillance is prohibited; use for unauthorized monitoring or tracking of individuals is prohibited; use for covert data collection or tracking is prohibited; use for building tools with sexually explicit content for minors is prohibited; and use for building tools with sexually suggestive content for minors is prohibited.

Example general AI provider restrictions include use for generating or promoting disinformation is prohibited; use for generating or promoting misinformation is prohibited; Use for creating false online engagement (e.g., comments, reviews) is prohibited; use for impersonating another individual without consent or legal right is prohibited; use for impersonating an organization without consent or legal right is prohibited; use for engaging in or promoting academic dishonesty is prohibited; and use for deploying automated systems (e.g., chatbots) without disclosing AI interactions when not obvious is prohibited.

The AI provider restrictions can also include context-specific requirements. These can related to particular vocational contexts in which the model cannot offer advice, diagnosis, or other professional opinion. One restricted context is healthcare and medical. These restrictions can include use for providing medical diagnoses is prohibited; use for prescribing medication is prohibited; use for offering treatment plans is prohibited; use for interpreting medical tests or results is prohibited; use for personalized medical advice or consultations is prohibited; and use that advises individuals in ways that may put the individual's health at risk is prohibited.

Another restricted context is financial services. These restrictions can include: use for offering investment advice is prohibited; use for predicting stock or commodity prices is prohibited; use for personal financial planning is prohibited; use for generating financial audits or official reports is prohibited; use for creating or promoting financial scams or fraud is prohibited.

Another restricted context is legal services. These restrictions can include: use for providing legal advice or counsel is prohibited; use for drafting legal contracts or agreements is prohibited; use for interpreting laws, regulations, or legal outcomes is prohibited; use for representing individuals or entities in legal matters is prohibited; and use for creating legally binding documents is prohibited.

Another restricted context is government and law enforcement. These restrictions can include use for impersonating government officials or agencies is prohibited; use for interfering with electoral processes or voting is prohibited; use for generating disinformation about government policies or events is prohibited; use for unauthorized surveillance or data collection is prohibited; and use for profiling individuals without consent is prohibited.

Another restricted context is high-risk applications. These restrictions can include use in autonomous vehicle navigation or control systems is prohibited; se in air traffic control or aviation management systems is prohibited; use in operating nuclear facilities or power grids is prohibited; use in life-critical medical devices or equipment is prohibited; and use in military weapon systems or targeting applications is prohibited.

A model trained on AI provider restrictions can receive an input and identify which of the provider restrictions are present, with a severity score for each.

These restricted contexts are one type of restricted input marker. However, the system can also allow for derived input markers based on sample files. For example, the UI 900 can allow an administrator to upload example files with example content that should be blocked and that can be recognized based on a combination of subject matter and formatting. An administrator can submit files that are representative of the types of inputs system should block. The AI management service analyzes those files and generates a derived AI pipeline input restriction. As part of doing this, an AI model can map characteristics of the document to other similar input files and to categories selected in the UI 900.

The AI model can generate a derived restriction input marker, which can represent multiple characteristics or categories of things that are not allowed as inputs to some AI pipelines. The derived restriction input marker can include formatting information, which can help with recognizing legal memos and sensitive content of that nature. The AI management service can associate the derived restriction input marker with an AI pipeline management profile. As has been discussed, the management profile is a record that can be sent like to wherever the AI pipeline input restrictions are detected, such as at the client application or a rules engine. The management profile can designate which categories of things to block and how highly to weight those restricted markers. The administrator can use the UI 900 to define which restricted input markers apply to which AI pipeline management profiles. The derived restricted input marker can be things like content format (e.g., legal memo), content subject (e.g., legal work), and content type (e.g., PII and confidential). Any of the categories of FIG. 9A can be restricted input markers (derived or explicit) that can be included in the management profile.

When a client application seeks to run an AI pipeline managed by the AI pipeline management service, the AI pipeline input is evaluated against the collection of restricted input markers, including derived restricted input markers. For example, the rules engine can evaluate the AI pipeline input using the management profile. Alternatively or in addition, the management controller can look for input restrictions based on the controller ruleset. The rules engine and/or management controller can together or separately generate a restriction score based on that evaluation. The score can take into account weights in the management profile for specific restricted input markers. Different restricted input markers (e.g., categories) can be turned on and off and weighted differently based on administrator settings. When the restriction score exceeds a threshold level, the input can be modified or blocked. Additionally or alternatively, a different AI pipeline object or AI pipeline can be used. In this way, the derived restricted input markers can cause the rules engine or management controller to block or modify an input and/or select different AI pipeline objects or AI pipelines to receive the original or modified input.

Figure 9B:
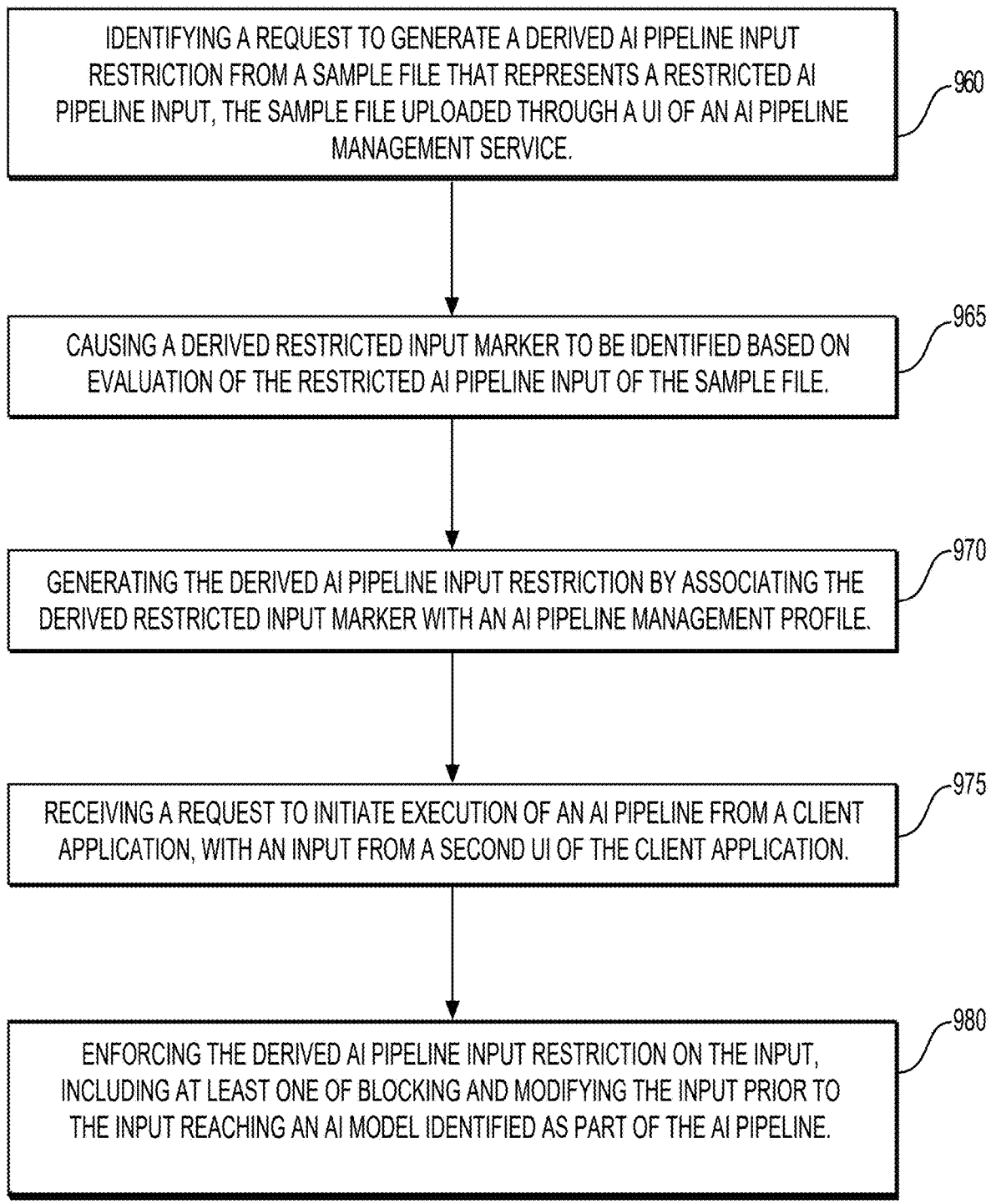

FIG. 9B is a flowchart of an example method for controlling client-application-initiated execution of artificial intelligence (AI) pipelines. In this example, derived restriction input markers are identified in AI pipeline inputs, resulting in various modifications to the inputs. These modified inputs can be directed to one or more different AI pipelines, which the rules engine or management controller can select in part based on which derived restriction input markers are present.

At stage 960, the AI pipeline management service can identify a request to generate a derived AI pipeline input restriction from a sample file. In one example, the request is explicit, such as by uploading one or more files using a UI of the AI pipeline management service. The files can represent examples of things to block or modify in an AI pipeline input. The generation request can be received from an administrative user of an AI pipeline management service. The UI provided by the AI pipeline management service can be a different UI than that of the client application.

At stage 965, the AI pipeline management service can cause a derived restricted input marker to be identified based on an evaluation of the restricted AI pipeline input of the sample file. This can include sending the sample file to an AI service that is trained to recognize categories of restricted input markers. The specific restricted input markers that the AI model looks for can be selected by the administrator, such as on a UI like that of FIG. 9A. A restriction profile can be received as an input to the AI model. In one example, the AI model is a large language model that receives the sample file, the restriction profile, and a prompt package that explains how to apply the restriction profile and a format for outputting a derived restricted input marker. For example, the derived restricted input marker can include a formatting template of the file and various patterns of information and subject matter context that make up the file. These can be merged with same category derived restricted input markers to create a file for each document type, in an example. The derived restricted input marker can alternatively specify a combination of restricted categories from the UI 900 of FIG. 9A. The derived restricted input marker can be recognized in a future AI pipeline input when the combination of restricted categories exists.

The derived restricted input marker can include any category that relates to the discussion of FIG. 9A. In one example, the derived restricted input marker includes content formatting that was recognized from the sample file. The rules engine can enforce the derived AI pipeline input restriction on the input in an instance in which the input to the AI pipeline meets a threshold similarity to the content formatting. This can also be based on an overall confidence score, which is discussed below.

The derived restricted input marker can also include a content subject. For example, a legal advice or medical advice topic could be detected. The enforcement can occur in an instance in which the input to the AI pipeline meets a threshold similarity to the content subject. Again, the threshold similarity can be considered confidence level, and whether the threshold is met can depend on the user and their activities, which can cause the rules engine to adjust the confidence threshold. Likewise, numerous derived restricted input markers can be detected, weighted, and added up to meet an overall confidence threshold. For example, the derived restricted input marker can include a content type that includes at least one of personally identifiable information and confidential information. The rules engine can enforce the derived AI pipeline input restriction in an instance in which the input to the AI pipeline meets a threshold similarity to the content type.

At stage 970, the derived AI pipeline input restriction can be generated by the AI pipeline management service or some other process by associating the derived restricted input marker with an AI pipeline management profile. In one example, the administrator can use the UI 900 to select the derived restricted input marker and assign it to the management profile. In the future, client applications and rules engines that utilize the management profile will look for the derived AI pipeline input restriction in AI pipeline inputs.

The derived AI pipeline input restriction can include a name for display on the GUI, and can include a file structure such as a JSON structure that references one or more restricted input markers. For example, this can include formatting and text that are restricted. The derived AI pipeline input restriction can also include an adjustable weight value that can be set by an administrator using a UI such as that of FIG. 9A.

At stage 975, a pipeline engine, rules engine, or the AI pipeline management service can identify a request to initiate execution of an AI pipeline from a client application. The execution request can include an input to the AI pipeline. The input can be received by the client application through a second user interface generated by the client application.

At stage 980, the rules engine or management controller can enforce the derived AI pipeline input restriction on the input to the AI pipeline. The enforcement can include at least one of blocking and modifying the input prior to the input reaching an AI model or AI service that is identified as part of the AI pipeline.

In one example, the input is blocked temporarily and the user is given a chance to update the input, accept the modified input, or cancel submission. The gateway or rules engine can cause a notification to be sent to the client application. The notification can describe the enforcement of the derived AI pipeline input restriction.

In one example, the notification includes an option to override the enforcement. The user can select the override option, causing the client application to send a message to the pipeline engine (which for discussion purposes includes the rules engine). The pipeline engine can cause the override request to be logged with the input. Both can be logged in association with user information, allowing for auditing in the future. At least part of the blocked input can be sent to the AI model, which can include sending the entire input or a modified input to the AI model or an AI service that executes the model. The modification can be a redaction or a rephrasing of the input that removes sensitive content in an example. For example, the rules engine can modify the blocked input to remove content that triggered the enforcement. This modification can occur prior to sending the blocked input to the AI model.

In one example, a confidence score is generated based on evaluation of multiple derived restricted input markers and the input to the AI pipeline. The confidence score can indicate who confident the rules engine or management controller is that the input should be blocked or modified. The management controller can work in conjunction with the rules engine, such as supplying user contextual information that changes the threshold to which the confidence score is compared. For example, the threshold can change based on work hours, geofencing, abnormal device usage, and the network over which the communication occurs. The threshold can be lowered by user context that is abnormal compared to the user's normal working routine. The threshold can be higher based on user context that aligns with the user's normal working routine. The threshold can act as a minimum confidence level needed before enforcement, in an example. If the confidence score exceeds the threshold, then enforcement can take place.

In addition to determining the minimum confidence level based on user characteristics of a user of the client application, different users can be associated with different minimum confidence levels. For example, an executive can require a higher confidence level than a recent hire or entry level employee. Employee tenure can result in a raised confidence level in an example.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for controlling client-application-initiated execution of artificial intelligence (AI) pipelines, comprising:
    receiving a request to generate a derived AI pipeline input restriction from a file that includes an example restricted input, the generation request being received from an administrative user of an AI pipeline management service, and the file being received through an upload to a first user interface (UI) provided by the AI pipeline management service;
    causing a derived restricted input marker to be identified based on an evaluation of the example restricted input of the file, wherein the derived restricted input marker includes a content subject;
    generating the derived AI pipeline input restriction by causing the AI pipeline management service to associate the derived restricted input marker with a management profile;
    identifying a request from a client application to initiate execution of an AI pipeline, the request comprising a received input from the client application, wherein the received input originates from an end user through a second UI generated by the client application; and
    enforcing the derived AI pipeline input restriction on the received input to the AI pipeline, wherein the enforcement includes at least one of blocking and modifying the received input prior to the received input reaching an AI model that is identified as part of the AI pipeline, and wherein the enforcement occurs in an instance in which the received input meets a threshold similarity to the content subject.

2. The method of claim 1, wherein blocking the received input includes causing a notification to be sent to the client application, the notification describing the enforcement of the derived AI pipeline input restriction.

3. The method of claim 2, further comprising determining to include an option to override the enforcement based on at least one of a user profile associated with the end user and an execution context associated with the client application.

4. The method of claim 3, wherein the notification includes the option to override the enforcement, the method further comprising:
- receiving a request to override the enforcement;
- causing a logging of the request and the received input in association with an identifier of the end user; and
- sending at least part of the blocked input to the AI model.

5. The method of claim 4, further comprising modifying the blocked input to remove content that triggered the enforcement, wherein the modifying occurs prior to sending the blocked input to the AI model.

6. The method of claim 1, wherein the derived restricted input marker includes content formatting, and wherein the enforcement occurs in an instance in which the received input meets a threshold similarity to the content formatting.

7. The method of claim 1, wherein the derived restricted input marker includes a content type that includes at least one of personally identifiable information (PII) and confidential information, and wherein the enforcement occurs in an instance in which the input to the AI pipeline meets a threshold similarity to the content type.

8. The method of claim 1, further comprising:
- generating a confidence score based on a cumulative evaluation of multiple derived restricted input markers and the received input,
- wherein the enforcing occurs based on determining that the confidence score exceeds a minimum confidence threshold for enforcement.

9. The method of claim 8, further comprising determining the minimum confidence threshold based on at least one of a user profile associated with the end user and an execution context associated with the client application, wherein different end users require different minimum confidence thresholds.

10. A non-transitory, computer-readable medium containing instructions that, when executed by a hardware-based processor, causes the processor to perform stages for routing a request to an appropriate artificial intelligence ("AI") model, the stages comprising:
- identifying a request to generate a derived AI pipeline input restriction from a file comprising an example restricted input, the generation request being received from an administrative user of an AI pipeline management service, and the file being received through an upload to a first user interface (UI) provided by the AI pipeline management service;
- causing a derived restricted input marker to be identified based on an evaluation of the example restricted of the file, wherein the derived restricted input marker includes a content subject;
- generating the derived AI pipeline input restriction by causing the AI pipeline management service to associate the derived restricted input marker with a management profile;
- identifying a request to initiate execution of an AI pipeline from a client application, the execution request comprising an input to the AI pipeline, wherein the input is received by the client application through a second UI generated by the client application; and
- enforcing the derived AI pipeline input restriction on the received input to the AI pipeline, wherein the enforcement includes at least one of blocking and modifying the received input prior to the input reaching an AI model that is identified as part of the AI pipeline, and wherein the enforcement occurs in an instance in which the received input meets a threshold similarity to the content subject.

11. The non-transitory, computer-readable medium of claim 10, wherein blocking the received input includes causing a notification to be sent to the client application, the notification describing the enforcement of the derived AI pipeline input restriction.

12. The non-transitory, computer-readable medium of claim 11, wherein the notification includes an option to override the enforcement, the stages further comprising:
- receiving a request to override the enforcement;
- causing a logging of the request and the received input in association with user information; and
- sending at least part of the blocked input to the AI model.

13. The non-transitory, computer-readable medium of claim 10, the stages further comprising modifying the blocked input to remove content that triggered the enforcement, wherein the modifying occurs prior to sending the blocked input to the AI model.

14. The non-transitory, computer-readable medium of claim 10, wherein the derived restricted input marker includes content formatting, and wherein the enforcement occurs in an instance in which the received input to the AI pipeline meets a threshold similarity to the content formatting.

15. The non-transitory, computer-readable medium of claim 10, wherein the derived restricted input marker includes a content type that includes at least one of personally identifiable information ("PII") and confidential information, and wherein the enforcement occurs in an instance in which the received input to the AI pipeline meets a threshold similarity to the content type.

16. A system for routing a request to an appropriate artificial intelligence ("AI") model, comprising:
- a memory storage including a non-transitory, computer-readable medium comprising instructions; and
- at least one hardware-based processor that executes the instructions to carry out stages comprising:
  - identifying a request to generate a derived AI pipeline input restriction from a file comprising a restricted AI pipeline input, the generation request being received from an administrative user of an AI pipeline management service, and the file being received through an upload to a first user interface (UI) provided by the AI pipeline management service;
  - causing a derived restricted input marker to be identified based on an evaluation of the restricted AI pipeline input of the file, wherein the derived restricted input marker includes a content subject;
  - generating the derived AI pipeline input restriction by causing the AI pipeline management service to associate the derived restricted input marker with a management profile;
  - identifying a request to initiate execution of an AI pipeline from a client application, the execution request comprising an input to the AI pipeline, wherein the input is received by the client application through a second UI generated by the client application; and
  - enforcing the derived AI pipeline input restriction on the received input, wherein the enforcement includes at least one of blocking and modifying the received input prior to the input reaching an AI model that is identified as part of the AI pipeline, and wherein the enforcement occurs in an instance in which the received input meets a threshold similarity to the content subject.

17. The system of claim 16, wherein blocking the received input includes causing a notification to be sent to the client application, the notification describing the enforcement of the derived AI pipeline input restriction.

18. The system of claim 17, wherein the notification includes an option to override the enforcement, the stages further comprising:
   receiving a request to override the enforcement;
   causing a logging of the request and the received input in association with user information;
   modifying the blocked input to remove content that triggered the enforcement, wherein the modifying occurs prior to sending the blocked input to the AI model; and
   sending at least part of the blocked input to the AI model.

19. The system of claim 16, wherein the derived restricted input marker includes a content format, and wherein the enforcement occurs in an instance in which the received input to the AI pipeline meets a threshold similarity to the content format.

20. The system of claim 16, wherein the derived restricted input marker includes a content type that includes at least one of personally identifiable information ("PII") and confidential information, and wherein the enforcement occurs in an instance in which the received input to the AI pipeline meets a threshold similarity to the content type.

* * * * *